United States Patent
Bingham et al.

(10) Patent No.: US 12,019,050 B2
(45) Date of Patent: Jun. 25, 2024

(54) ULTRASOUND INSPECTION SYSTEM AND METHOD

(71) Applicant: The Boeing Company, Chicago, IL (US)

(72) Inventors: Jill P. Bingham, Seattle, WA (US); Barry A. Fetzer, Renton, WA (US); Gary E. Georgeson, Tacoma, WA (US); Samuel R. Goertz, Issaquah, WA (US)

(73) Assignee: The Boeing Company, Arlington, VA (US)

( * ) Notice: Subject to any disclaimer, the term of this patent is extended or adjusted under 35 U.S.C. 154(b) by 198 days.

(21) Appl. No.: 17/575,777

(22) Filed: Jan. 14, 2022

(65) Prior Publication Data
US 2022/0326190 A1    Oct. 13, 2022

Related U.S. Application Data

(60) Provisional application No. 63/171,619, filed on Apr. 7, 2021.

(51) Int. Cl.
*G01N 29/24* (2006.01)
*B25J 9/16* (2006.01)
(Continued)

(52) U.S. Cl.
CPC ........ *G01N 29/2418* (2013.01); *B25J 9/1605* (2013.01); *B25J 9/1664* (2013.01);
(Continued)

(58) Field of Classification Search
CPC .. G01N 29/2418; G01N 29/04; G01N 29/043; G01N 29/34; G01N 29/46; G01N 29/26; G01N 29/262; G01N 29/225; G01N 29/265; G01N 29/0645; G01N 35/0099; G01N 2291/0231; G01N 2291/023; G01N 2291/103; G01N 2291/106; G01N 2291/2694; G01N 21/1702; G01N 21/45;
(Continued)

(56) References Cited

U.S. PATENT DOCUMENTS

| | | | |
|---|---|---|---|
| 5,576,948 A | 11/1996 | Stern et al. | |
| 6,667,798 B1 | 12/2003 | Markendorf et al. | |

(Continued)

*Primary Examiner* — Suman K Nath
(74) *Attorney, Agent, or Firm* — Walters & Wasylyna LLC

(57) ABSTRACT

A system for inspecting a structure includes a laser ultrasound device configured to direct laser light onto a surface of the structure that generates ultrasonic waves within the structure and to generate an array of ultrasound data representative of the ultrasonic waves. The system includes a robotic arm configured to move the laser light across the surface. The system includes a multiplex controller configured to trigger generation of the ultrasonic waves within the structure at an inspection location and to receive the array of ultrasound data for the inspection location. The system includes a computer system that includes a motion-control module configured to control movement of the laser light relative to the surface of the structure, a motion-tracking module configured determine when the laser light is at the inspection location, and an inspection module configured to process the array of ultrasound data to inspect the structure at the inspection location.

20 Claims, 11 Drawing Sheets

(51) Int. Cl.
*G01N 29/04* (2006.01)
*G01N 29/22* (2006.01)
*G01N 29/265* (2006.01)
*G01N 35/00* (2006.01)

(52) U.S. Cl.
CPC .......... *G01N 29/04* (2013.01); *G01N 29/225* (2013.01); *G01N 29/265* (2013.01); *G01N 35/0099* (2013.01); *B25J 9/1692* (2013.01); *G01N 2291/0231* (2013.01); *G01N 2291/103* (2013.01); *G01N 2291/2694* (2013.01); *G05B 2219/40613* (2013.01); *G05B 2219/49007* (2013.01)

(58) Field of Classification Search
CPC .......... G01N 2021/1706; B25J 9/1605; B25J 9/1664; B25J 9/1692; G05B 2219/40613; G05B 2219/49007
See application file for complete search history.

(56) References Cited

U.S. PATENT DOCUMENTS

| | | |
|---|---|---|
| 7,023,536 B2 | 4/2006 | Zhang et al. |
| 7,312,861 B2 | 12/2007 | Loen |
| 7,605,347 B2 | 10/2009 | Izawa et al. |
| 7,957,583 B2 | 6/2011 | Boca et al. |
| 8,095,237 B2 | 1/2012 | Habibi et al. |
| 8,332,165 B1 | 12/2012 | Tat et al. |
| 9,164,066 B1 | 10/2015 | Bossi et al. |
| 9,310,482 B2 | 4/2016 | Rosenberg et al. |
| 9,404,898 B1 | 8/2016 | Georgeson et al. |
| 9,575,033 B1 | 2/2017 | Georgeson et al. |
| 9,625,423 B2 | 4/2017 | Bossi et al. |
| 2012/0304774 A1* | 12/2012 | Ishioka ............. G01N 29/2418 73/643 |
| 2016/0303736 A1 | 10/2016 | Setsuda |
| 2017/0010242 A1 | 1/2017 | Safai |
| 2017/0176321 A1 | 6/2017 | Georgeson et al. |
| 2017/0176322 A1 | 6/2017 | Motzer et al. |
| 2017/0176393 A1 | 6/2017 | O'Donnell et al. |
| 2017/0248551 A1 | 8/2017 | Pelivanov et al. |
| 2018/0009059 A1 | 1/2018 | Aoki |
| 2019/0331757 A1 | 10/2019 | Motzer et al. |
| 2020/0141908 A1 | 5/2020 | Bingham et al. |

* cited by examiner

ULTRASOUND INSPECTION SYSTEM AND METHOD

PRIORITY

This application claims priority from U.S. Ser. No. 63/171,619 filed on Apr. 7, 2021.

GOVERNMENT CONTRACT

This invention was made with government support under the NASA Advanced Composites Program, 202C21, conducted by the National Aeronautics and Space Administration. The government may have certain rights in this invention.

FIELD

The present disclosure relates generally to nondestructive inspection and, more particularly, to systems and methods for automatically inspecting a structure using ultrasound.

BACKGROUND

In manufacturing aircraft, vehicles, and other structures, inspection of parts used to form these structures is often performed to determine whether the parts will have desired parameters for a desired performance. Additionally, the structures and parts may be inspected as part of normal maintenance when the aircraft, vehicle, and other structure are in use.

Non-destructive testing is commonly performed on these parts. Non-destructive testing is used to evaluate the properties of the part without altering the ability to use the part in service. Ultrasound testing is a type of non-destructive testing. Ultrasound testing is often used to perform inspections on aircraft parts that include composite materials. Ultrasound testing involves transmitting acoustic waves through a test object, such as an aircraft part or structure.

Different types of properties may be evaluated using different types of acoustic waves. In conventional ultrasonic inspection, different types of acoustic waves may be generated within the part and detected by using different types of ultrasound inspection devices or by performing multiple scans of the part. However, using multiple types of ultrasound inspection devices or performing multiple inspection passes of the part may use an undesirable amount of time, energy, and resources. Additionally, it may be difficult to integrate ultrasound data received from different types of ultrasound inspection devices.

Thus, there is a need for a system and method for inspecting a structure that take into account at least some of the issues discussed above. Accordingly, those skilled in the art continue with research and development efforts in the field of pressure bulkhead assembly.

SUMMARY

Disclosed are examples of a system for inspecting a structure, a method of inspecting a structure, and a robotic control system for automatically inspecting a structure. The following is a non-exhaustive list of examples, which may or may not be claimed, of the subject matter according to the present disclosure.

In an example, the disclosed system includes a laser ultrasound device configured to direct laser light onto a surface of the structure that generates ultrasonic waves within the structure and to generate an array of ultrasound data representative of the ultrasonic waves. The system further includes a robotic arm configured to move the laser light across the surface of the structure. The system also includes a multiplex controller coupled to the laser ultrasound device and configured to trigger generation of the ultrasonic waves within the structure at an inspection location of the structure and to receive the array of ultrasound data for the inspection location from the laser ultrasound device. The system additionally includes a computer system coupled to the robotic arm and to the multiplex controller. The computer system includes a motion-control module configured to control movement of the laser light relative to the surface of the structure. The computer system further includes a motion-tracking module configured to determine when the laser light is at the inspection location. The computer system also includes an inspection module configured to process the array of ultrasound data to inspect the structure at the inspection location.

In an example, the disclosed method includes steps of: (1) moving an optical head of a laser ultrasound device relative to a surface of the structure using a robotic arm, wherein the optical head is configured to transmit laser light that is configured to generate ultrasonic waves within the structure and to detect a response to the ultrasonic waves; (2) determining that the optical head is at an inspection location of the structure; (3) triggering generation of the ultrasonic waves within the structure at the inspection location of the structure using a multiplex controller; (4) generating of an array of ultrasound data representative of the ultrasonic waves based on the response; (5) receiving the array of ultrasound data for the inspection location by the multiplex controller; and (6) processing the array of ultrasound data to inspect the structure at the inspection location.

In an example, the disclosed robotic control system includes a robot controller coupled to a robotic arm and configured to control a position of the robotic arm. The robotic control system further includes a multiplex controller coupled to a laser ultrasound device and configured to control the laser ultrasound device. The robotic control system also includes a computer system coupled to the robot controller and to the multiplex controller. The computer system includes at least one processor and memory storing at least one computer-readable program that, in response to execution by the at least one processor, causes the computer system to: (1) generate a scan path for movement of an optical head of the laser ultrasound device across a surface of the structure based on a three-dimensional model of the structure; (2) determine a trigger location along the scan path the corresponds to the inspection location of the structure; (3) instruct the robot controller to move the optical head along the scan path relative to the surface of the structure using the robotic arm; (4) determine when the optical head is at the trigger location; (5) instruct the robot controller to position the optical head at an initial device-position relative to the surface of the structure at the trigger location; (6) instruct the multiplex controller to trigger generation of ultrasonic waves within the structure at the inspection location and to receive an array of ultrasound data, representative of the ultrasonic waves, from the laser ultrasound device; and (7) process the array of ultrasound data provided from the multiplex controller to inspect the structure.

Other examples of the disclosed system, method and robotic control system will become apparent from the following detailed description, the accompanying drawings, and the appended claims.

DETAILED DESCRIPTION

Figure 1:
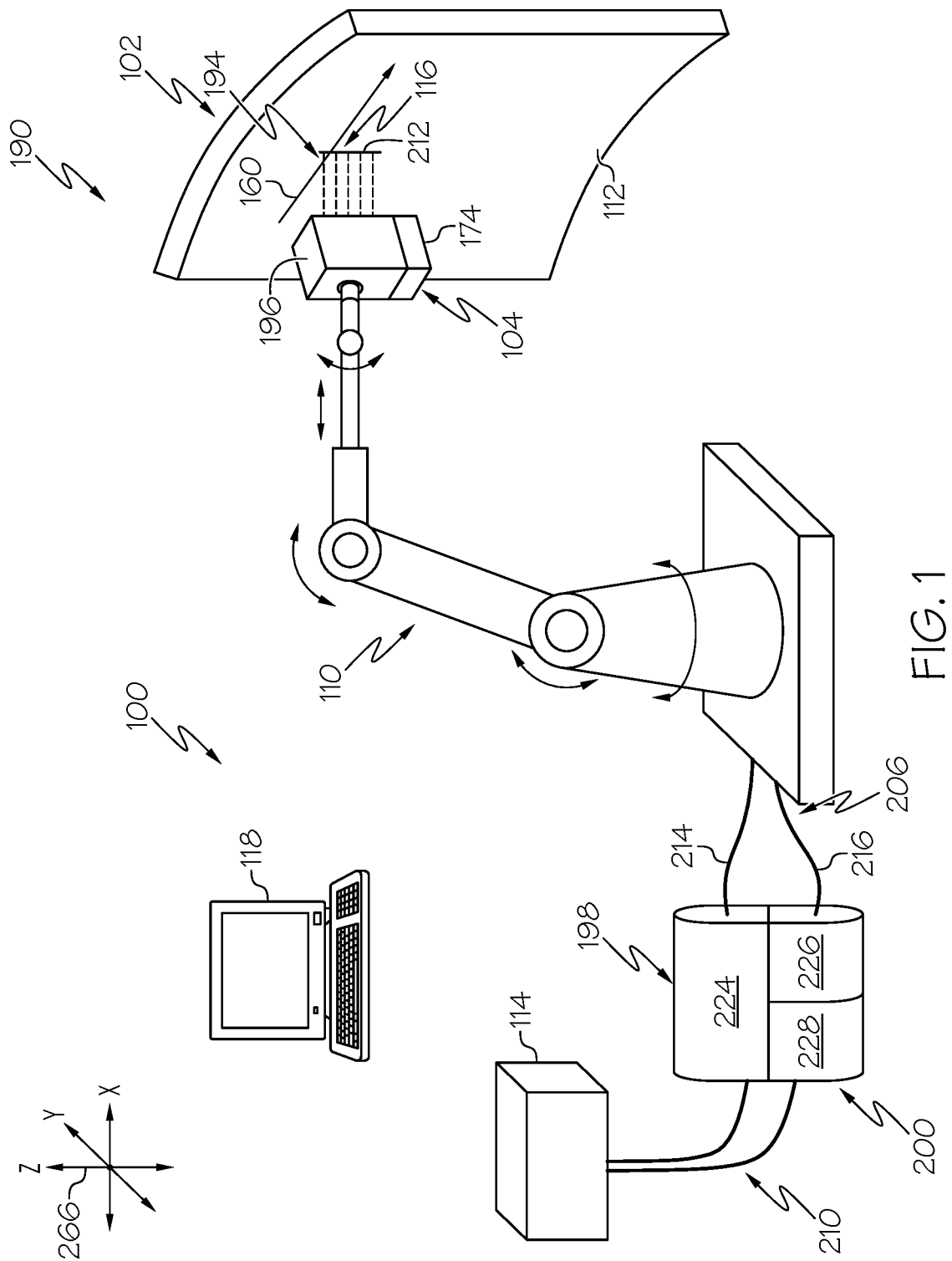
FIG. 1 is a schematic illustration of an example of an inspection environment in which a system for inspecting a structure operates.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component or step preceded with the word "a" or "an" should be understood as not excluding a plurality of features, elements, components or steps, unless such exclusion is explicitly recited.

Illustrative, non-exhaustive examples, which may be, but are not necessarily, claimed, of the subject matter according to the present disclosure are provided below. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

Referring to FIGS. 1-8, by way of examples, the present disclosure is directed to a system 100 for inspecting a structure 102. The system 100 enables automated laser ultrasonic nondestructive inspection and evaluation of the structure 102 and provides increased capabilities to a laser ultrasonic inspection device.

Figure 2:
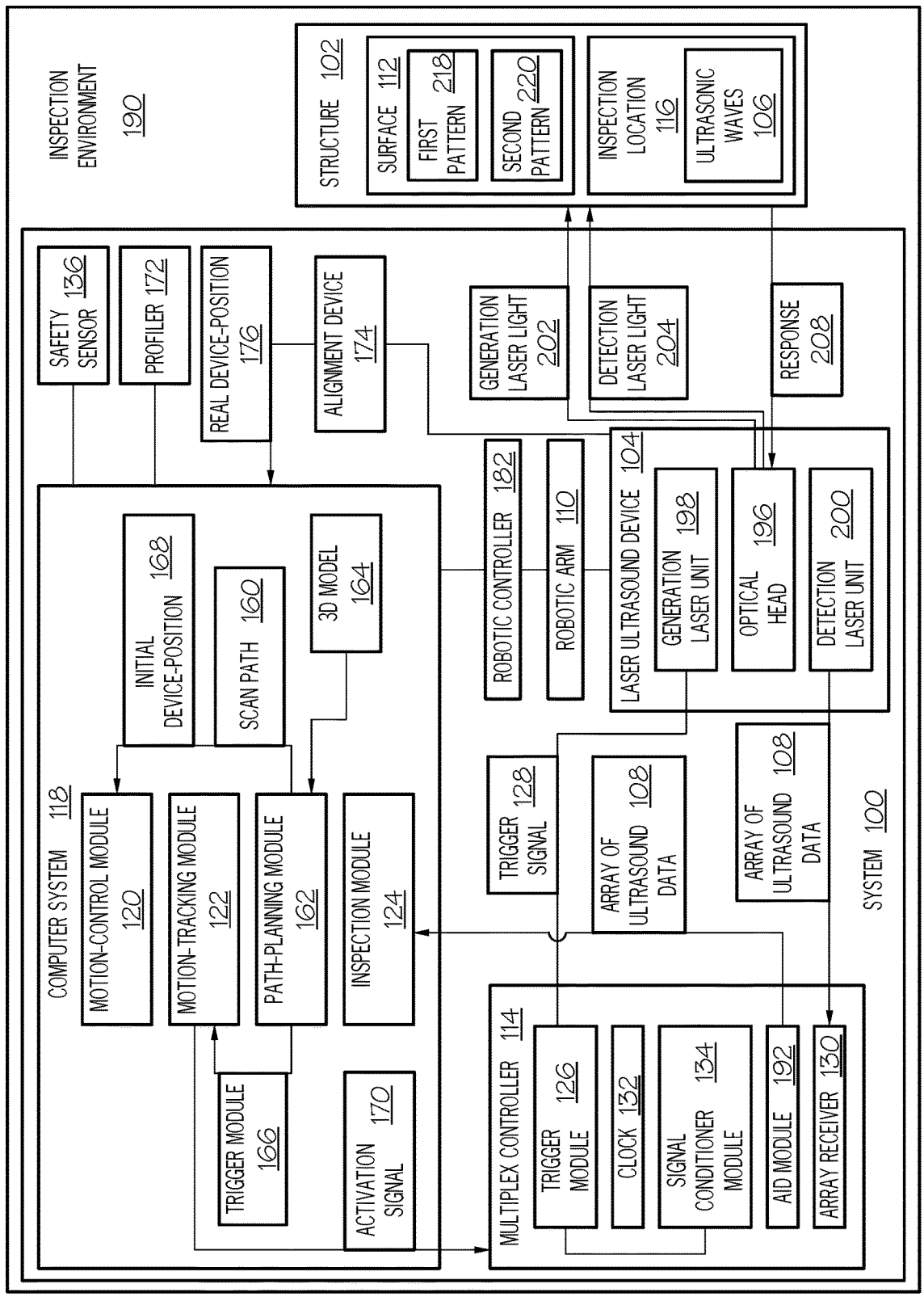
FIG. 2 is a schematic block diagram of an example of the inspection environment.

Referring to FIGS. 1 and 2, which depict examples of an inspection environment 190. The inspection environment 190 includes the system 100 and the structure 102. The inspection environment 190 is an example of an operating environment in which the system 100 is used to inspect, evaluate, or test the structure 102. In one or more examples, the system 100 includes a laser ultrasound device 104, a robotic arm 110, a multiplex controller 114, and a computer system 118. In one or more examples, the structure 102 includes any article, object, part, or component that is to be inspected, evaluated, or tested using the system 100. In one or more examples, the structure 102 is a composite structure.

The laser ultrasound device 104 is configured to direct laser light 194 (FIG. 1) onto a surface 112 of the structure 102. The laser light 194 is configured to generate ultrasonic waves 106 within the structure 102. For example, the laser light 194 has an energy that is configured to cause the ultrasonic waves 106 to travel through the structure 102. The laser light 194 is also used to detect a response 208 (FIG. 2) to the ultrasonic waves 106. For example, the laser light 194 is also transmitted onto the surface 112 in a manner that does not cause ultrasonic waves in the structure 102, and a portion of the laser light 194 that is returned to and detected by the laser ultrasound device 104 includes information that is used to identify the response 208 to the ultrasonic waves 106. The laser ultrasound device 104 is further configured to generate an array of ultrasound data 108 (FIG. 2) representative of the ultrasonic waves 106.

In one or more examples, the laser ultrasound device 104 includes an optical head 196. The optical head 196 is configured to emit the laser light 194 (FIG. 1) in the form of a pattern 212 (FIG. 1) onto the surface 112 of the structure 102. In one or more examples, the optical head 196 serves as a laser transmitter, configured to direct the laser light 194 onto the surface 112, and a laser receiver, configured to receive a portion of the laser light 194 that is returned (e.g., reflected) back from the surface 112 and used to detect the response 208.

The robotic arm 110 is configured to move the laser light 194 across the surface 112 of the structure 102. In one or more examples, the optical head 196 is coupled to an end of the robotic arm 110, such as in the form of an end effector (e.g., as shown in FIG. 1). In one or more examples, the robotic arm 110 is configured to move the optical head 196 about a number of axes relative to the surface 112 of the structure 102 such that the pattern 212 of the laser light 194 is moved across the surface 112, such as along a scan path 160. In one or more examples, the robotic arm 110 is a scanning robot arm. For example, the robotic arm 110 is a robotic movement system commercially available from KUKA Robotics Corporation. In other examples, a different type of movement system is used to move the optical head 196, such as a gantry robot or other suitable automated movement system 240 (e.g., as shown in FIGS. 4-7).

In one or more examples, the optical head 196 is configured to transmit (e.g., emit and/or direct) generation laser light 202 (FIG. 2) onto the surface 112 of the structure 102. The generation laser light 202 is an example of the laser light 194 (FIG. 1) and is also referred to as excitation laser light.

In one or more examples, the generation laser light 202 is transmitted in a manner that forms a first pattern 218 (FIG. 2) on the surface 112 of the structure 102. The first pattern 218 of the generation laser light 202 is a number of areas of the surface 112 onto which the generation laser light 202 illuminates. The area on the surface 112 can have any geometry, such as circular, oval, square, oblique, or another shape. In one or more examples, the first pattern 218 of the generation laser light 202 takes the form of a point. In one or more examples, the first pattern 218 of the generation laser light 202 takes the form of a continuous line segment or a non-continuous line segment. For example, a continuous line segment is a series of contiguous areas and a non-continuous line segment is a series of noncontiguous areas. In other examples, the first pattern 218 has a shape resembling a rectangle or other suitable shape.

The generation laser light 202 is configured to generate the ultrasonic waves 106 within the structure 102 when the generation laser light 202 encounters the structure 102. For example, the ultrasonic waves 106 occur when the generation laser light 202 is transmitted onto the surface 112. In one or more examples, energy in the generation laser light 202 causes thermoplastic expansion in the structure 102. The thermoplastic expansion results in the ultrasonic waves 106 in the structure 102. The ultrasonic waves 106 are ultrasonic signals having a frequency that is dependent on a particular implementation, such as the material used to form the structure 102, a pulse width of the generation laser light 202, and other factors. In one or more examples, the generation laser light 202 takes the form of pulsed laser light. The generation laser light 202 has any suitable wavelength, such as approximately 1053 nm.

The laser ultrasound device 104 is configured to detect a material response to the ultrasonic waves 106 travelling within the structure 102. Generally, the material response includes ultrasonic signals, or ultrasonic waves, that occur as a result of scattering, reflection, modulation, and other changes to the ultrasonic waves 106 travelling within the structure 102. In one or more examples, the material response to the ultrasonic waves 106 is detected by transmitting detection laser light 204 (FIG. 2) onto the surface 112 of the structure 102 and detecting the response 208 (FIG. 2) formed by the detection laser light 204.

In one or more examples, the optical head 196 is configured to transmit (e.g., emit and/or direct) the detection laser light 204 (FIG. 2) onto the surface 112 of the structure 102. The detection laser light 204 is an example of the laser light 194 (FIG. 1). In one or more examples, the detection laser light 204 is transmitted in a manner that forms a second pattern 220 (FIG. 2) on the surface 112 of the structure 102. The second pattern 220 of the detection laser light 204 is a number of areas of the surface 112 onto which the detection laser light 204 illuminates. The area on the surface 112 can have any geometry, such as circular, oval, square, oblique, or another shape. In one or more examples, the second pattern 220 of the detection laser light 204 takes the form of a point. In one or more examples, the second pattern 220 of the detection laser light 204 takes the form of the continuous line segment or the non-continuous line segment. In other examples, the second pattern 220 has a shape resembling a rectangle or other suitable shape. In one or more examples, the second pattern 220 substantially lines up with, or overlaps, the first pattern 218.

The detection laser light 204 is configured to form the response 208 (FIG. 2). The response 208 is a portion of the detection laser light 204 that has been deflected by the ultrasonic waves 106, travelling within the structure 102 and reaching the surface 112, and reflected from the surface 112 of the structure 102 back to the optical head 196. For example, the ultrasonic waves 106 are scattered, reflected, modulated, or otherwise changed while travelling within the structure 102 and create mechanical vibrations on the surface 112. The mechanical vibrations on the surface 112 are detected in the response 208. In one or more examples, the detection laser light 204 has any suitable wavelength, such as approximately 1550 nm.

In one or more examples, the laser ultrasound device 104 includes a generation laser unit 198 and a detection laser unit 200. The generation laser unit 198 is configured to generate and transmit the generation laser light 202 (FIG. 2). The detection laser unit 200 is configured to generate and transmit the detection laser light 204 (FIG. 2) and to detect the detection laser light 204 returned in the response 208.

In one or more examples, the generation laser unit 198 is optically coupled with the optical head 196 via an optical communications link 206 (FIG. 1) to transmit the generation laser light 202 to the optical head 196. In one or more examples, the generation laser unit 198 is remote from the optical head 196. For example, the generation laser unit 198 is fiber-optic-based and includes a generation laser source 224 (FIG. 1) and a number of generation laser optical fiber 214 (FIG. 1), such as an array of generation laser optical fibers 214.

The generation laser source 224 is configured to generate the generation laser light 202 (FIG. 2). The generation laser optical fiber 214 is configured to receive the generation laser light 202 from the generation laser source 224 and to transmit the generation laser light 202 to the optical head 196. In one or more examples, the number of generation laser optical fiber 214 forms at least a portion of an optical output 232 (e.g., as shown in FIGS. 4-7) of the optical head 196 such that the generation laser light 202 is directed onto the surface 112 of the structure 102 in the form of the first pattern 218.

In one or more examples, the generation laser source 224 includes a laser generator, an array of laser diodes, or other optical source for the generation laser light 202. In one or more examples, the generation laser source 224 is a diode pump laser that generates and emits pulsed laser light.

In one or more examples, the detection laser unit 200 is optically coupled with the optical head 196 via the optical communications link 206 (FIG. 1) to transmit the detection laser light 204 to the optical head 196 and receive the response 208 from the optical head 196. In one or more examples, the detection laser unit 200 is remote from the optical head 196. For example, the detection laser unit 200 is fiber-optic-based and includes a detection laser source 226 (FIG. 1), an interferometer 228, and a number of detection laser optical fiber 216 (FIG. 1), such as an array of detection laser optical fibers 216.

The detection laser source 226 is configured to generate the detection laser light 204 (FIG. 2). The interferometer 228 is configured to identify information from the detection laser light 204 forming the response 208. The interferometer 228 is further configured to generate the array of ultrasound data 108 representative of the ultrasonic waves 106. The interferometer 228 is also configured to transmit the array of ultrasound data 108 to the multiplex controller 114. The detection laser optical fiber 216 is configured to receive the detection laser light 204 from the detection laser source 226 and to transmit the detection laser light 204 to the optical head 196. In one or more examples, the number of detection laser optical fiber 216 forms at least a portion of the optical output 232 (e.g., as shown in FIGS. 4-7) of the optical head 196 such that the detection laser light 204 is directed onto the surface 112 of the structure 102 in the form of the second pattern 220. The detection laser optical fiber 216 is also configured to receive the detection laser light 204 forming the response 208 from the optical head 196 and to transmit the response 208 to the interferometer 228. In one or more examples, the number of detection laser optical fiber 216 receives a returned portion of the detection laser light 204 forming the response 208 that corresponds to each area on the surface 112 of the structure 102 that forms the second pattern 220.

In one or more examples, the detection laser source 226 includes a laser generator, an array of laser diodes, or other optical source for the detection laser light 204. In one or more examples, the generation laser source 224 is a diode pump laser that generates and emits pulsed laser light. In one or more examples, the interferometer 228 includes a number of interferometers. In one of more examples, the interferometer 228 is a Sagnac interferometer.

The computer system 118 is coupled to and is in communication with the robotic arm 110 and the multiplex controller 114. The computer system 118 is configured to provide operational instructions to the robotic arm 110 and to the multiplex controller 114. The multiplex controller 114 provides a communication and control interface between the computer system 118, the laser ultrasound device 104, and the robotic arm 110 during an inspection operation. As an example, the multiplex controller 114 controls when the generation laser light 202 (FIG. 2) is transmitted onto the surface 112 of the structure 102 to generate the ultrasonic waves 106, as directed by the computer system 118 and based on positional information of the robotic arm 110. As another example, the multiplex controller 114 receives the array of ultrasound data 108 and transmits the array of ultrasound data 108 to the computer system 118 for processing.

In one or more examples, the multiplex controller 114 is configured to trigger generation of the ultrasonic waves 106 within the structure 102 at an inspection location 116 of the structure 102. The multiplex controller 114 is further configured to receive the array of ultrasound data 108 for the inspection location 116 from the laser ultrasound device 104. Use of the multiplex controller 114 enables a single controller to be used to control operation of the generation laser unit 198 and the detection laser unit 200. Use of the multiplex controller 114 also facilitates signal processing of multiple data channels corresponding to the array of ultrasound data 108 provided by the detection laser unit 200 during the inspection operation.

The multiplex controller 114 is coupled to the laser ultrasound device 104, such as to the generation laser unit 198 and to the detection laser unit 200. In one or more examples, the generation laser unit 198 is coupled to and is in communication with the multiplex controller 114 via a data-communication link 210 (FIG. 1), such as a number of wired connections, a number of wireless connections, or a combination thereof. In one or more examples, the detection laser unit 200 is coupled to and is in communication with the multiplex controller 114 via the data-communication link 210, such as a number of wired connections, a number of wireless connections, or a combination thereof.

In one or more examples, the multiplex controller 114 includes a trigger module 126. The trigger module 126 is configured to transmit a trigger signal 128 (FIG. 2) to the laser ultrasound device 104. The trigger signal 128 is configured to trigger generation of the ultrasonic waves 106 within the structure 102 at the inspection location 116. For example, the multiplex controller 114 transmits the trigger signal 128 to the generation laser unit 198 when the optical head 196 is over the inspection location 116. The generation laser unit 198 generates the generation laser light 202 (FIG. 2) and transmits the generation laser light 202 to the optical head 196 for transmission onto the surface 112 of the structure 102 at the inspection location 116 in response to the trigger signal 128.

In one or more examples, the multiplex controller 114 includes an array receiver 130. The array receiver 130 is configured to receive the array of ultrasound data 108 from the laser ultrasound device 104. The array receiver 130 includes a plurality of receiver elements, such as a phased array of receiver elements. The array receiver 130 enables the multiplex controller 114 to receive the array of ultrasound data 108 from the detection laser unit 200 (e.g., the interferometer 228) using a plurality of individual data channels, such as up to 128 channels. For example, the detection laser light 204 is transmitted from the optical head 196, such as from the array of detection laser optical fibers 216 (FIG. 1), as an array of detection laser beams that form an array of detection spots (e.g., the second pattern 220) on the surface 112 of the structure 102. The interferometer 228 receives and detects the response 208 associated with each one of the array of detection laser beams of the detection laser light 204. The interferometer 228 generates the array of ultrasound data 108 corresponding to the ultrasonic signal responses to the ultrasonic waves 106, propagating through the structure 102 and returned to the surface 112, detected at different spots on the surface 112. The array of ultrasound data 108, corresponding to the response 208 associated with each one of the array of detection laser beams, is transmitted from the interferometer 228 to the array receiver 130 of the multiplex controller 114 along the plurality of individual data channels. Accordingly, the array receiver 130 of the multiplex controller 114 enables responses 208 from different spots on the surface 112 to be received at the same time and have the responses 208 linked in time.

In one or more examples, the multiplex controller 114 is configured to sync transmission of the trigger signal 128 (FIG. 2) and receipt of the array of ultrasound data 108 (FIG. 2). Syncing transmission of the trigger signal 128 and receipt of the array of ultrasound data 108 accounts for a difference between the speed of the laser light 194 (FIG. 1) (e.g., the generation laser light 202) (FIG. 2) transmitted from the optical head 196 and the processing speed of the array receiver 130 receiving the array of ultrasound data 108. For example, without such a syncing operation, the ultrasonic waves 106 may be generated by the generation laser light 202 and detected by the detection laser light 204 before the multiplex controller 114 is prepared to receive the array of ultrasound data 108 from the laser ultrasound device 104.

In one or more examples, the syncing operation of the transmitter (e.g., the trigger module 126 and/or the generation laser unit 198 shown in FIG. 2) to the receiver (e.g., the array receiver 130 and/or the detection laser unit 200 as shown in FIG. 2) is essential to compensate for various electronic delays that may occur in one or both transmitter and/or receiver electronics of the multiplex controller 114, the generation laser unit 198, and/or the detection laser unit 200. For example, because they are different modules and external to each other physically, the syncing operation assures they are working in conjunction with one another. In other words, the syncing operation prevents the transmitter from firing before the receiver is ready to listen for reception of ultrasound data. Additionally, in one or more examples, the activation signal 170 ties the multiplex controller 114 to the robot position, generated from the 3D model 164, and the multiplex controller 114 ties to the generation laser unit 198 via the syncing operation. This is configuration is illustrative of how the different modules form the system 100.

In one or more examples, the multiplex controller 114 includes a clock 132 (FIG. 2). The clock 132 is configured to delay transmission of trigger signal 128 from the trigger module 126 by a predetermined period. In one or more examples, the computer system 118 is configured or adapted to generate an activation signal 170 (FIG. 2) that is transmitted to the multiplex controller 114. The multiplex controller 114 generates the trigger signal 128 and prepares to receive the array of ultrasound data 108 in response to the activation signal 170. The clock 132 delays transmission of the trigger signal 128 to the laser ultrasound device 104 (e.g., to the generation laser unit 198) by the predetermined period until the array receiver 130 of the multiplex controller 114 is prepared to receive the array of ultrasound data 108. In one or more examples, the predetermined period of the delay is approximately twenty (20) microseconds (us). In one or more examples, the clock 132 is implemented using hardware, software, firmware, or a combination thereof (e.g., a timing module). Delaying transmission of the trigger signal 128 using the clock 132 is an example implementation of the syncing operation described above.

In one or more examples, the multiplex controller 114 includes a signal conditioner module 134 (FIG. 2). The signal conditioner module 134 is configured to apply appropriate signal conditioning to the trigger signal 128 provided to the generation laser unit 198 for generating the generation laser light 202 (FIG. 2). In one or more examples, the signal conditioner module 134 is configured to modify at least one of a period, a waveform, and a voltage of the trigger signal 128 for use by the laser ultrasound device 104.

In one or more examples, the signal conditioner module 134 is configured to modify the trigger signal 128 to delay transmission of the trigger signal 128 to the laser ultrasound device 104 by the predetermined period. For example, the signal conditioner module 134 modifies one or more parameters of the trigger signal 128 such that the laser ultrasound device 104 (e.g., the generation laser unit 198) receives the trigger signal 128 after the array receiver 130 of the multiplex controller 114 is prepared to receive the array of ultrasound data 108. Delaying transmission of the trigger signal 128 using the signal conditioner module 134 is an example implementation of the syncing operation described above.

In one or more examples, the multiplex controller 114 includes an analog-to-digital ("A/D") module 192. The analog-to-digital module 192 is configured to convert analog signals or data, such as outputted by the laser ultrasound device 104 or another ultrasound device, to digital signals or data suitable for processing by the computer system 118. The analog-to-digital module 192 is any suitable type of analog-to-digital converter.

In one or more examples, the multiplex controller 114 includes various other operational and control elements. In one or more examples, the multiplex controller 114 is phased array ultrasonic receiver that provides data acquisition and data analysis functions for a fully automated ultrasonic inspection operation. In one or more examples, the multiplex controller 114 is implemented using hardware, software, firmware, or a combination thereof. For example, the multiplex controller 114 is a FOCUS PX Instrument commercially available from Olympus Corporation.

In one or more examples, the multiplex controller 114 enables simple and easy expansion of the system 100 to accommodate additional ultrasound inspection devices, such as described in more detail herein and illustrated by example in FIGS. 4-7. For example, multiple response signals (e.g., response 208) generated from each one of the multiple ultrasound inspection devices is received and processed by the same multiplex controller 114.

Figure 3:
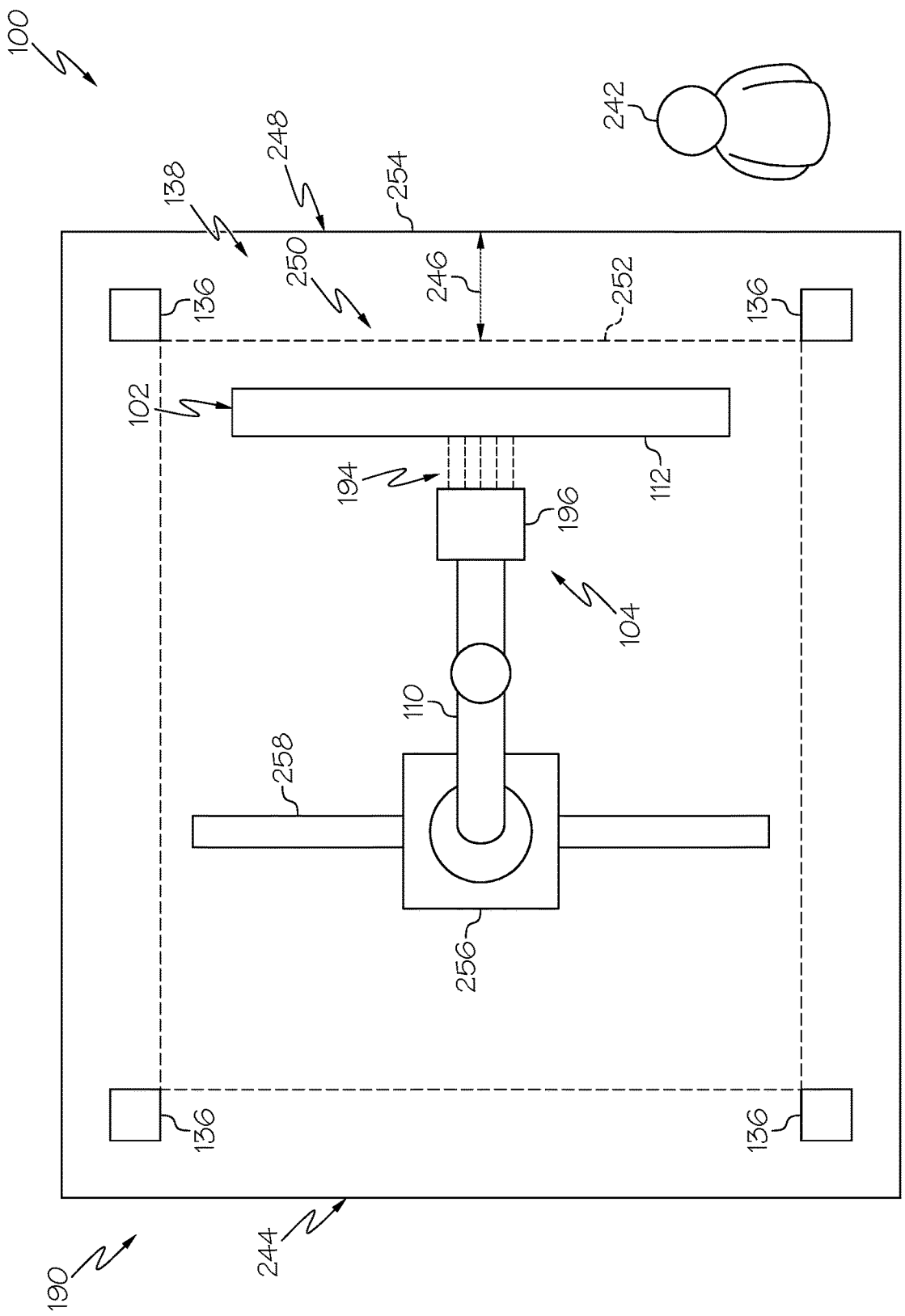
FIG. 3 is a schematic, top plan view of an example of a safety zone of the inspection environment in which the system operates.

Referring to FIG. 3, which schematically illustrates an example of the system 100 operating within a safety zone 138 in which the robotic arm 110 moves the optical head 196 of the laser ultrasound device 104 relative to the surface 112 of the structure 102 during an inspection operation. In one or more examples, the laser ultrasound device 104 includes an integral shutoff mechanism that terminates transmission of the laser light 194 to protect against eye injury to a human operator 242 located in the inspection environment 190.

In one or more examples, the system 100 includes a safety sensor 136. The safety sensor 136 is coupled to and is in communication with the computer system 118. The safety sensor 136 is configured to detect entry of the laser ultrasound device 104 into the safety zone 138. The computer system 118 is configured to automatically deenergize the laser ultrasound device 104 in response to the safety sensor 136 detecting entry of the laser ultrasound device 104 into the safety zone 138.

In one or more examples, the safety sensor 136 is configured to detect entry of the operator 242 into the safety zone 138. The computer system 118 is configured to automatically deenergize the laser ultrasound device 104 in response to the safety sensor 136 detecting entry of the operator 242 into the safety zone 138.

Use of the safety zone 138 and automatic shutoff of the laser light 194 ensures that an adequate nominal ocular hazard distance is maintained during the inspection operation by preventing an output for the laser light 194 from crossing a minimum safety threshold formed by the safety zone 138. A minimum threshold distance 246 between the output for the laser light 194 and the human operator 242 may depend on various factors, such as the classification of the laser producing the laser light 194 and/or the wavelength and power of the laser light 194. In one or more examples of fiber-optic-based lasers of the system 100, the minimum threshold distance 246 is approximately two (2) meters.

In one or more examples, the inspection environment 190 includes an inspection station 244. The inspection station 244 is utilized to inspect, test, or otherwise evaluate the structure 102 using the system 100. The inspection station 244 is associated with or includes the robotic arm 110, at least a portion of the laser ultrasound device 104 (e.g., the optical head 196, coupled to the robotic arm 110), the structure 102 being inspected, the safety sensor 136, and any other machine tools or support tooling used in connection with the inspection operation. Generally, during the inspection operation, the robotic arm 110, the optical head 196, and the structure 102 are located inside of the inspection station 244 and the operator 242 is located outside of the inspection station 244.

In one or more examples, the safety zone 138 includes an outer boundary 248 that defines an outer perimeter of the inspection station 244 and an inner boundary 250 that is spaced away from the outer boundary 248. Generally, the safety zone 138 is a three-dimensional volume of space within which a potential ocular hazard may be present during at least some period of the inspection operation.

In one or more examples, the safety zone 138 is established by or is associated with a single safety sensor 136. In one or more examples, the safety zone 138 is established by or is associated with a plurality of safety sensors 136 (e.g., as illustrated in FIG. 3).

In one or more examples, the safety zone 138 corresponds to a field of view or sensing zone of the safety sensor 136. For example, the safety sensor 136 has an inherent or adjustable three-dimensional volume of space relative to the safety sensor 136, within which the safety sensor 136 is capable of detecting the presence of the robotic arm 110, the optical head 196, and/or the operator 242.

In one or more example, the inner boundary 250 of the safety zone 138 corresponds to a field of view or sensing zone of the safety sensor 136 (e.g., an inner set of safety sensors). For example, the safety sensor 136 has an inherent or adjustable two-dimensional area of space relative to the safety sensor 136, across which the safety sensor 136 is capable of detecting the presence of the robotic arm 110 and/or the optical head 196. As an example, the safety sensor 136 generates a laser light curtain 252 that forms the inner boundary 250 of the safety zone 138.

In one or more examples, the outer boundary 248 of the safety zone 138 is formed by a safety structure 254 (e.g., a safety cage) constructed at the outer perimeter of the inspection station 244. The safety structure 254 provides a physical barrier between the operator 242 and the safety zone 138. Alternatively, in one or more examples, the outer boundary 248 of the safety zone 138 corresponds to a field of view or sensing zone of the safety sensor 136 (e.g., an outer set of safety sensors). For example, the safety sensor 136 has a two-dimensional area of space relative to the safety sensor 136, across which the safety sensor 136 is capable of detecting the presence of the operator 242. As an example, the safety sensor 136 generates a laser light curtain that forms the outer boundary 248 of the safety zone 138.

The safety sensor 136 includes, or takes the form of, any suitable type of sensing device configured to detect the presence of the robotic arm 110, the optical head 196, and/or the operator 242 at least partially within the safety zone 138. Examples of the safety sensor 136 include, but are not limited to, optical cameras, optical sensors, infrared cameras, infrared sensors, laser sensors, through-beam sensors, area scanners, and the like and/or combinations thereof.

Utilization of the safety sensor 136 and, optionally, the safety structure 254 to form the safety zone 138 enables the inspection station 244 to be movable and/or adjustable in size depending on a particular implementation or inspection need. Accordingly, the inspection station 244 is portable and adjustable, which beneficially provides operational flexibility to the system 100.

In one or more examples, the system 100 includes a movable platform 256. The robotic arm 110 is coupled to the movable platform 256. The movable platform 256 is configured to move the robotic arm 110 relative to the structure 102, for example, within the inspection station 244. In one or more examples, the movable platform 256 is a component of the movement system 240 (FIGS. 4-7). In one or more examples, the movable platform 256 is configured to move along a track 258 located in the inspection station 244. Utilization of the movable platform 256 provides additional flexibility and portability to the system 100.

Figure 4:
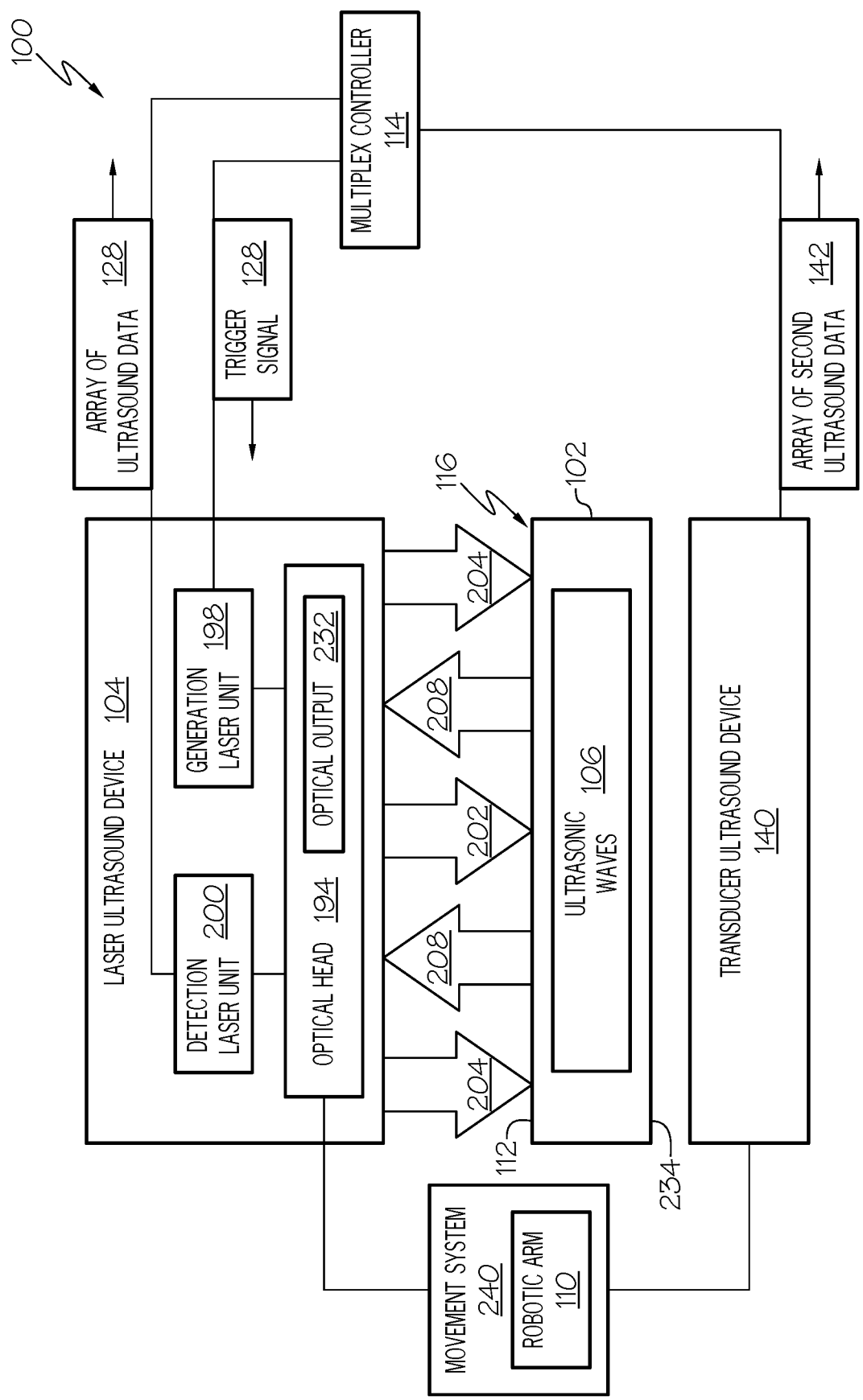
FIG. 4 is a schematic block diagram of an example of a portion of the system including a laser ultrasound device and a transducer ultrasound device to inspect the structure.
Figure 5:
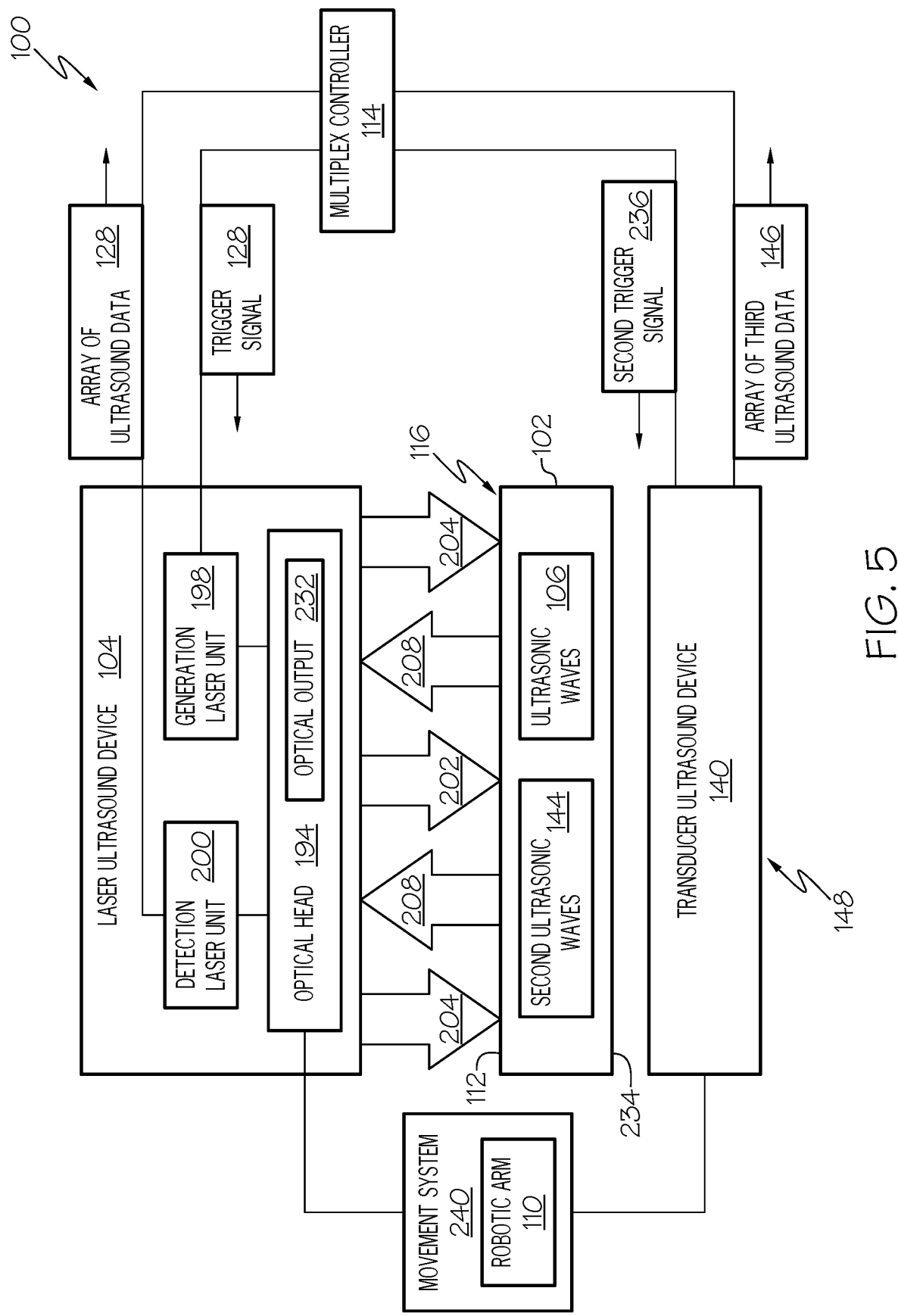
FIG. 5 is a schematic block diagram of an example of a portion of the system including the laser ultrasound device and a transducer ultrasound device to inspect the structure.

Referring to FIGS. 4 and 5, which schematically illustrate examples of a portion of the system 100 that incorporates a transducer ultrasound device 140 during the inspection operation. In one or more examples, the system 100 utilizes the multiplex controller 114 to integrate laser-based ultrasound inspection and transducer-based ultrasound inspection for inspecting the structure 102. In one or more examples, the system 100 includes the transducer ultrasound device 140.

As illustrated in FIG. 4, in one or more examples, the transducer ultrasound device 140 is configured to generate an array of second ultrasound data 142 representative of the ultrasonic waves 106. The multiplex controller 114 is coupled to the transducer ultrasound device 140. The multiplex controller 114 is configured to receive the array of second ultrasound data 142 for the inspection location 116 from the transducer ultrasound device 140.

In one or more examples, the transducer ultrasound device 140 includes at least one ultrasonic transducer. In one or more examples, the transducer ultrasound device 140 includes an array (e.g., a two-dimensional array) of ultrasonic transducers. The transducer ultrasound device 140 is configured to detect a response to the ultrasonic waves 106 generated by the generation laser light 202. For example, the ultrasonic transducers are configured to receive ultrasonic signals propagated through the structure 102 in response to the ultrasonic waves 106.

In one or more examples, utilization of the transducer ultrasound device 140 enables detection of the ultrasonic waves 106 and inspection of the structure 102 from a secondary position, which provides additional data (e.g., the array of second ultrasound data 142 for the inspection location 116) used to evaluate the structure 102. For example, as illustrated in FIG. 4, the transducer ultrasound device 140 is positioned at the inspection location 116 relative to a second surface 234 of the structure 102, such as opposite the laser ultrasound device 104. In one or more examples, the laser ultrasound device 104 detects the ultrasonic waves 106 propagating through the structure 102 and returned to the surface 112 and the transducer ultrasound device 140 detects the ultrasonic waves 106 propagating through the structure 102 to the second surface 234.

In one or more examples, the array receiver 130 (FIG. 2) of the multiplex controller 114 is configured to receive the array of second ultrasound data 142 from the transducer ultrasound device 140. The array receiver 130 enables the multiplex controller 114 to receive the array of ultrasound data 108 from laser ultrasound device 104 and to receive the array of second ultrasound data 142 from the transducer ultrasound device 140 using the plurality of individual data channels. Accordingly, the array receiver 130 of the multiplex controller 114 enables responses to the ultrasonic waves 106 to be detected at different spots on the surface 112 and the second surface 234 at the same time and have the responses linked in time.

As illustrated in FIG. 5, in one or more examples, the transducer ultrasound device 140 is configured to generate second ultrasonic waves 144 within the structure 102. The transducer ultrasound device 140 is further configured to generate an array of third ultrasound data 146 representative of the second ultrasonic waves 144. The multiplex controller 114 is configured to trigger generation of the second ultrasonic waves 144 within the structure 102 at a second inspection location 148 of the structure 102. The multiplex controller 114 is further configured to receive the array of third ultrasound data 146 for the second inspection location 148 from the transducer ultrasound device 140.

In one or more examples, the transducer ultrasound device 140 is configured to detect a response to the second ultrasonic waves 144 generated by the transducer ultrasound device 140. For example, at least one of the ultrasonic transducers (e.g., a transmit transducer) of the transducer ultrasound device 140 is configured to transmit an ultrasonic signal to the structure 102 that generates the second ultrasonic waves 144 within the structure 102. At least one of the ultrasonic transducers (e.g., a receive transducer) of the transducer ultrasound device 140 is configured to receive ultrasonic signals propagated and returning through the structure 102 in response to the second ultrasonic waves 144.

In one or more examples, utilization of the transducer ultrasound device 140 enables detection of the second ultrasonic waves 144 (e.g., a different type of ultrasonic waves), inspection of the structure 102 at the second inspection location 148, and/or inspection of the structure 102 from a secondary position, which provides additional data (e.g., the array of third ultrasound data 146 for the second inspection location 148) used to evaluate the structure 102. For example, as illustrated in FIG. 5, the transducer ultrasound device 140 is positioned at the second inspection location 148 relative to the second surface 234 of the structure 102, such as opposite the laser ultrasound device 104. In one or more examples, the laser ultrasound device 104 detects the ultrasonic waves 106 propagating through the structure 102 and returned to the surface 112 and the transducer ultrasound device 140 detects the second ultrasonic waves 144 propagating through the structure 102 and returned to the second surface 234.

In one or more examples, the trigger module 126 (FIG. 2) of the multiplex controller 114 is configured to transmit a second trigger signal 236 to the transducer ultrasound device 140. The second trigger signal 236 is configured to trigger generation of the second ultrasonic waves 144 within the structure 102 at the second inspection location 148. For example, the multiplex controller 114 transmits the second trigger signal 236 to the transmit transducers of the transducer ultrasound device 140 when the transducer ultrasound device 140 is over the second inspection location 148. The transmit transducers transmit the ultrasonic signal to the surface 112 of the structure 102 at the second inspection location 148 in response to the second trigger signal 236.

In one or more examples, the array receiver 130 (FIG. 2) of the multiplex controller 114 is configured to receive the array of third ultrasound data 146 from the transducer ultrasound device 140. The array receiver 130 enables the multiplex controller 114 to receive the array of ultrasound data 108 from the laser ultrasound device 104 and to receive the array of third ultrasound data 146 from the transducer ultrasound device 140 using the plurality of individual channels. Accordingly, the array receiver 130 of the multiplex controller 114 enables responses to the ultrasonic waves 106 and the second ultrasonic waves 144 to be detected at different spots on the surface 112 and the second surface 234 at the same time and have the responses linked in time.

In one or more examples, multiple ultrasound inspection devices (e.g., one or more laser ultrasound device 104 and one or more transducer ultrasound device 140) are synchronized to a single multiplex controller 114, for example, as described herein above. As an example, the multiplex controller 114 sequences its input (#1, #2, #3, etc.) after a corresponding one of the multiple ultrasound inspection devices has been triggered. In this example, there is one trigger signal (e.g., trigger signal 128 and second trigger signal 236 as shown in FIG. 5) for each one of the multiple ultrasound inspection devices.

In one or more examples, the system 100 includes a movement system 240. The movement system 240 is configured to move the transducer ultrasound device 140 relative to the structure 102, such as across the second surface 234, during the inspection operation. In one or more examples, the movement system 240 includes, or takes the form of, a robot, such as a scanning robotic arm similar to the robotic arm 110 associated with the laser ultrasound device 104.

In the example illustrated in FIG. 5, the inspection location 116 and the second inspection location 148 are different. However, in other examples, the inspection location 116 and the second inspection location 148 can be approximately the same or at least partially overlap each other. In such examples, the laser ultrasound device 104 detects the ultrasonic waves 106 propagating through the structure 102 and returned to the surface 112 and the second ultrasonic waves 144 propagating through the structure 102 to the surface 112. The transducer ultrasound device 140 detects the second ultrasonic waves 144 propagating through the structure 102 and returned to the second surface 234 and the ultrasonic waves 106 propagating through the structure 102 to the second surface 234. In one or more examples, the ultrasonic waves 106 and the second ultrasonic waves 144 are different types of ultrasonic waves. While the example illustrated in FIG. 5 depicts the transducer ultrasound device 140 positioned at the second inspection location 148 relative to the second surface 234 of the structure 102, in other examples, the transducer ultrasound device 140 may be positioned at the second inspection location 148 relative to the surface 112 of the structure 102 or another surface of the structure 102 during the inspection operation.

Figure 6:
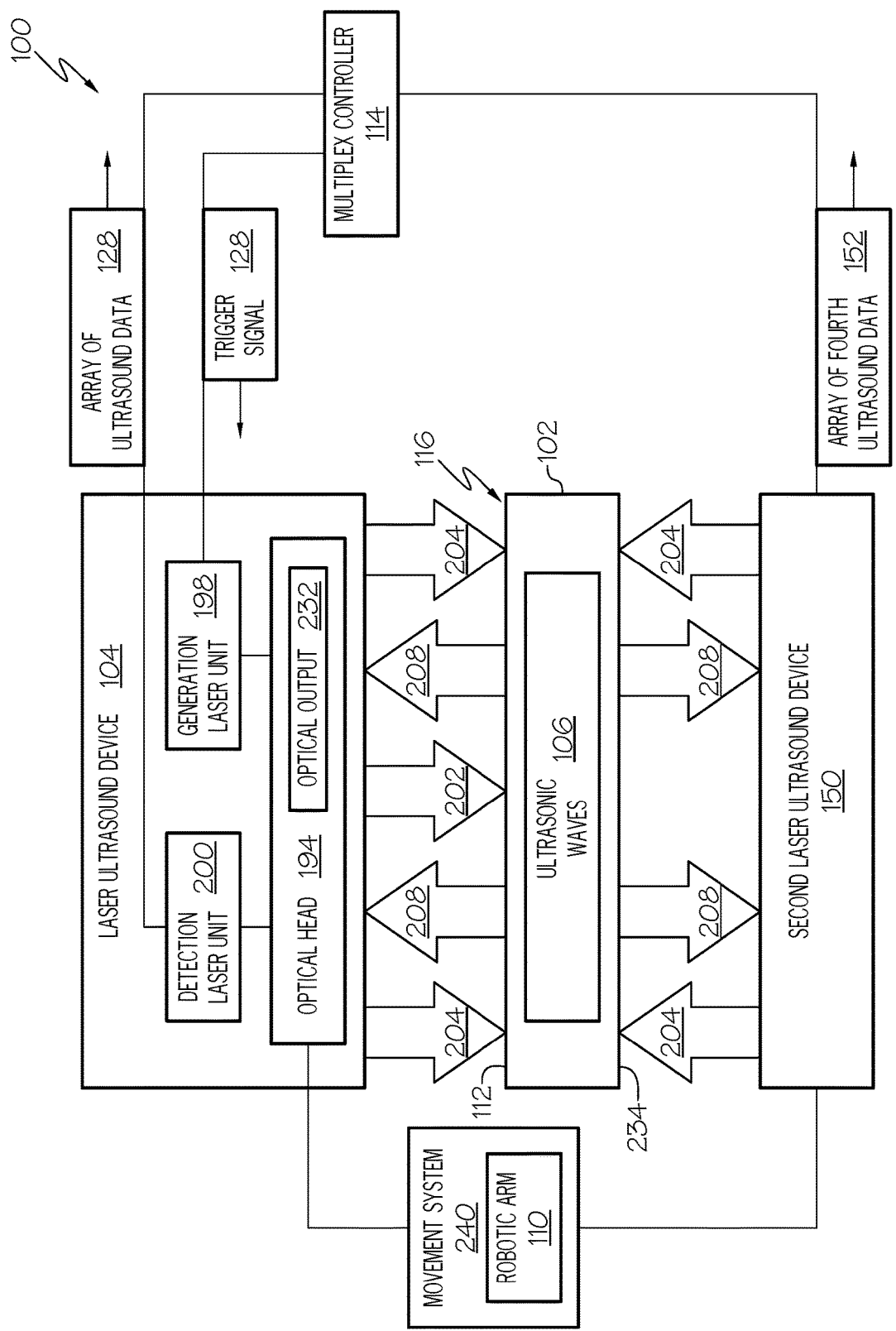
FIG. 6 is a schematic block diagram of an example of a portion of the system including the laser ultrasound device and a second laser ultrasound device to inspect the structure.
Figure 7:
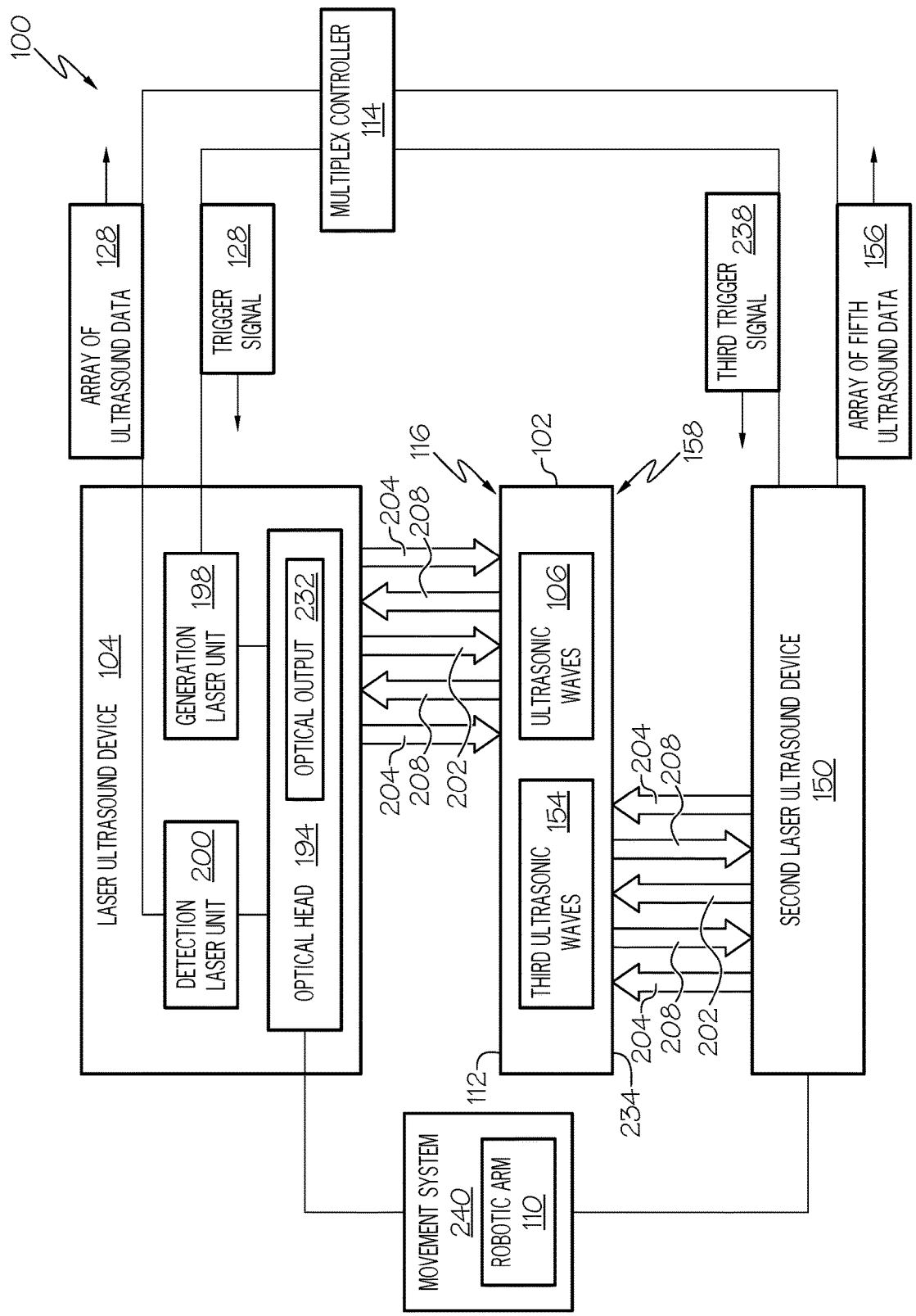
FIG. 7 is a schematic block diagram of an example of a portion of the system including the laser ultrasound device and the second laser ultrasound device to inspect the structure.

Referring to FIGS. 6 and 7, which schematically illustrate examples of a portion of the system 100 that incorporates a second laser ultrasound device 150. In one or more examples, the system 100 utilizes the multiplex controller 114 to integrate multiple laser-based ultrasound inspections for inspecting the structure 102. In one or more examples, the system 100 includes the second laser ultrasound device 150.

As illustrated in FIG. 6, in one or more examples, the second laser ultrasound device 150 is configured to generate an array of fourth ultrasound data 152 representative of the ultrasonic waves 106. The multiplex controller 114 is coupled to the second laser ultrasound device 150. The multiplex controller 114 is configured to receive the array of fourth ultrasound data 152 for the inspection location 116 from the second laser ultrasound device 150.

In one or more examples, the second laser ultrasound device 150 includes at least a second detection laser unit and a second optical head configured to generate and transmit the detection laser light 204 onto the second surface 234 and to receive the returned portion of the detection laser light 204 forming the response 208, similar to the detection laser unit 200 and optical head 196 of the laser ultrasound device 104. For example, the second laser ultrasound device 150 is configured to detect ultrasonic signals propagated through the structure 102 in response to the ultrasonic waves 106.

In one or more examples, utilization of the second laser ultrasound device 150 enables detection of the ultrasonic waves 106 and inspection of the structure 102 from a secondary position, which provides additional data (e.g., the array of fourth ultrasound data 152 for the inspection location 116) used to evaluate the structure 102. For example, as illustrated in FIG. 6, the second laser ultrasound device 150 is positioned at the inspection location 116 relative to the second surface 234 of the structure 102, such as opposite the laser ultrasound device 104. In one or more examples, the laser ultrasound device 104 detects the ultrasonic waves 106 propagating through the structure 102 and returned to the surface 112 and the second laser ultrasound device 150 detects the ultrasonic waves 106 propagating through the structure 102 to the second surface 234.

In one or more examples, the array receiver 130 (FIG. 2) of the multiplex controller 114 is configured to receive the array of fourth ultrasound data 152 from the second laser ultrasound device 150. The array receiver 130 enables the multiplex controller 114 to receive the array of ultrasound data 108 from laser ultrasound device 104 and to receive the array of fourth ultrasound data 152 from the second laser ultrasound device 150 using the plurality of individual data channels. Accordingly, the array receiver 130 of the multiplex controller 114 enables responses to the ultrasonic waves 106 to be detected at different spots on the surface 112 and the second surface 234 at the same time and have the responses linked in time.

In one or more examples, the multiplex controller 114 is configured to sync transmission of the trigger signal 128 to the laser ultrasound device 104 and receipt of the array of fourth ultrasound data 152 from the second laser ultrasound device 150. Syncing transmission of the trigger signal 128 and receipt of the array of fourth ultrasound data 152 accounts for a difference between the speed of the generation laser light 202 transmitted from the optical head 196 and the processing speed of the array receiver 130 receiving the array of fourth ultrasound data 152.

As illustrated in FIG. 7, in one or more examples, the second laser ultrasound device 150 is configured to generate third ultrasonic waves 154 within the structure 102. The second laser ultrasound device 150 is further configured to generate an array of fifth ultrasound data 156 representative of the third ultrasonic waves 154. The multiplex controller 114 is configured to trigger generation of the third ultrasonic waves 154 within the structure 102 at a third inspection location 158 of the structure 102. The multiplex controller 114 is further configured to receive the array of fifth ultrasound data 156 for the third inspection location 158 from the second laser ultrasound device 150.

In one or more examples, the second laser ultrasound device 150 includes a second generation laser unit configured to generate and transmit the generation laser light 202 onto the second surface 234 that generates the third ultrasonic waves 154 within the structure, similar to the generation laser unit 198 of the laser ultrasound device 104. For example, the second laser ultrasound device 150 is configured to detect ultrasonic signals propagated through the structure 102 in response to the third ultrasonic waves 154 generated by the second laser ultrasound device 150.

In one or more examples, utilization of the second laser ultrasound device 150 enables detection of the third ultrasonic waves 154 (e.g., a different type of ultrasonic waves), inspection of the structure 102 at the third inspection location 158, and/or inspection of the structure 102 from a secondary position, which provides additional data (e.g., the array of fifth ultrasound data 156 for the third inspection location 158) used to evaluate the structure 102. For example, as illustrated in FIG. 7, the second laser ultrasound device 150 is positioned at the second inspection location 148 relative to the second surface 234 of the structure 102, such as opposite the laser ultrasound device 104. In one or more examples, the laser ultrasound device 104 detects the ultrasonic waves 106 propagating through the structure 102 and returned to the surface 112 and the second laser ultrasound device 150 detects the third ultrasonic waves 154 propagating through the structure 102 and returned to the second surface 234.

In one or more examples, the trigger module 126 (FIG. 2) of the multiplex controller 114 is configured to transmit a third trigger signal 238 to the second laser ultrasound device 150. The third trigger signal 238 is configured to trigger generation of the third ultrasonic waves 154 within the structure 102 at the third inspection location 158. For example, the multiplex controller 114 transmits the third trigger signal 238 to the second generation laser unit of the second laser ultrasound device 150 when the second optical head of the second laser ultrasound device 150 is over the third inspection location 158.

In one or more examples, the array receiver 130 (FIG. 2) of the multiplex controller 114 is configured to receive the array of fifth ultrasound data 156 from the second laser ultrasound device 150. The array receiver 130 enables the multiplex controller 114 to receive the array of ultrasound data 108 from the laser ultrasound device 104 and to receive the array of fifth ultrasound data 156 from the second laser ultrasound device 150 using the plurality of individual channels. Accordingly, the array receiver 130 of the multiplex controller 114 enables responses to the ultrasonic waves 106 and the third ultrasonic waves 154 to be detected at different spots on the surface 112 and the second surface 234 at the same time and have the responses linked in time.

In one or more examples, the multiplex controller 114 is configured to sync transmission of the third trigger signal 238 to the second laser ultrasound device 150 and receipt of the array of fifth ultrasound data 156 from the second laser ultrasound device 150. Syncing transmission of the third trigger signal 238 and receipt of the array of fifth ultrasound data 156 accounts for a difference between the speed of the generation laser light 202 transmitted from the second optical head of the second laser ultrasound device 150 and the processing speed of the array receiver 130 receiving the array of fifth ultrasound data 156. In one or more examples, the syncing operation is performed using the clock 132 (FIG. 2) and/or the signal conditioner module 134 to implement a transmission delay of the predetermined period, as described herein above.

In one or more examples, multiple ultrasound inspection devices (e.g., one or more laser ultrasound device 104 and one or more second laser ultrasound device 150) are synchronized to a single multiplex controller 114, for example, as described herein above. As an example, the multiplex controller 114 sequences its input (#1, #2, #3, etc.) after a corresponding one of the multiple ultrasound inspection devices has been triggered. In this example, there is one trigger signal (e.g., trigger signal 128 and third trigger signal 238 as shown in FIG. 7) for each one of the multiple ultrasound inspection devices.

In one or more examples, the movement system 240 is configured to move the second optical head of the second laser ultrasound device 150 relative to the structure 102 such that the detection laser light 204 and the generation laser light 202 moves across the second surface 234 during the inspection operation. In one or more examples, the movement system 240 includes, or takes the form of, a robot, such as a scanning robotic arm similar to the robotic arm 110 associated with the laser ultrasound device 104.

In the example illustrated in FIG. 7, the inspection location 116 and the third inspection location 158 are different. However, in other examples, the inspection location 116 and the third inspection location 158 can be approximately the same or at least partially overlap each other. In such examples, the laser ultrasound device 104 detects the ultrasonic waves 106 propagating through the structure 102 and returned to the surface 112 and the third ultrasonic waves 154 propagating through the structure 102 to the surface 112. The second laser ultrasound device 150 detects the third ultrasonic waves 154 propagating through the structure 102 and returned to the second surface 234 and the ultrasonic waves 106 propagating through the structure 102 to the second surface 234. In one or more examples, the ultrasonic waves 106 and the third ultrasonic waves 154 are different types of ultrasonic waves. While the example illustrated in FIG. 7 depicts the second laser ultrasound device 150 positioned at the third inspection location 158 relative to the second surface 234 of the structure 102, in other examples, the second laser ultrasound device 150 may be positioned at the third inspection location 158 relative to the surface 112 of the structure 102 or another surface of the structure 102 during the inspection operation.

It can be appreciated that the system 100 can incorporate or utilize any feasible number of laser ultrasound devices (e.g., the laser ultrasound device 104, the second laser ultrasound device 150, a third laser ultrasound device, etc.) and transducer ultrasound devices (e.g., the transducer ultrasound device 140, a second transducer ultrasound device, a third transducer ultrasound device, etc.) to inspect any feasible number of inspection locations (e.g., the inspection location 116, the second inspection location 148, the third inspection location 158, a fourth inspection location, etc.). The system 100 advantageously enables scan data to be collected concurrently and the ultrasound data output from all of the devices to be received by the multiplex controller 114.

Accordingly, utilization of the multiplex controller 114 enables ultrasound data to be received and processed from different types of ultrasound inspection devices and links the ultrasound data from the different ultrasound inspection devices together with the same clock (e.g., the clock 132). Additionally, utilization of the multiplex controller 114 facilitates modular functionality to the system 100 by enabling different types of ultrasound inspection devices to inspect the same structure 102.

In one or more examples, the multiple ultrasound inspection devices (e.g., one or more laser ultrasound device 104, one or more transducer ultrasound device 140, and/or one or more second laser ultrasound device 150) are synchronized to a single multiplex controller 114, for example, as described herein above. As an example, the multiplex controller 114 sequences its input (#1, #2, #3, etc.) after a corresponding one of the multiple ultrasound inspection devices has been triggered. In this example, there is one trigger signal (e.g., trigger signal 128, second trigger signal 236, and/or third trigger signal 238 as shown in FIGS. 5 and 7) for each one of the multiple ultrasound inspection devices.

Referring now to FIG. 2, the computer system 118 is configured or adapted to provide operational instructions to the multiplex controller 114 for controlling the laser ultrasound device 104 and any other ultrasound inspection devices, such as the transducer ultrasound device 140 (FIGS. 4 and 5) and/or the second laser ultrasound device 150 (FIGS. 6 and 7). The computer system 118 is also configured or adapted to provide operational instructions to the robotic arm 110 for moving the laser light 194 (FIG. 1) across the surface 112 of the structure 102 according to the scan path 160 that is predetermined. The computer system 118 is further configured to process the array of ultrasound data 108 and any other ultrasound data, such as the array of second ultrasound data 142 (FIG. 4), the array of third ultrasound data 146 (FIG. 5), the array of fourth ultrasound data 152 (FIG. 6), and the array of fifth ultrasound data 156 (FIG. 7) to inspect the structure 102.

Figure 8:
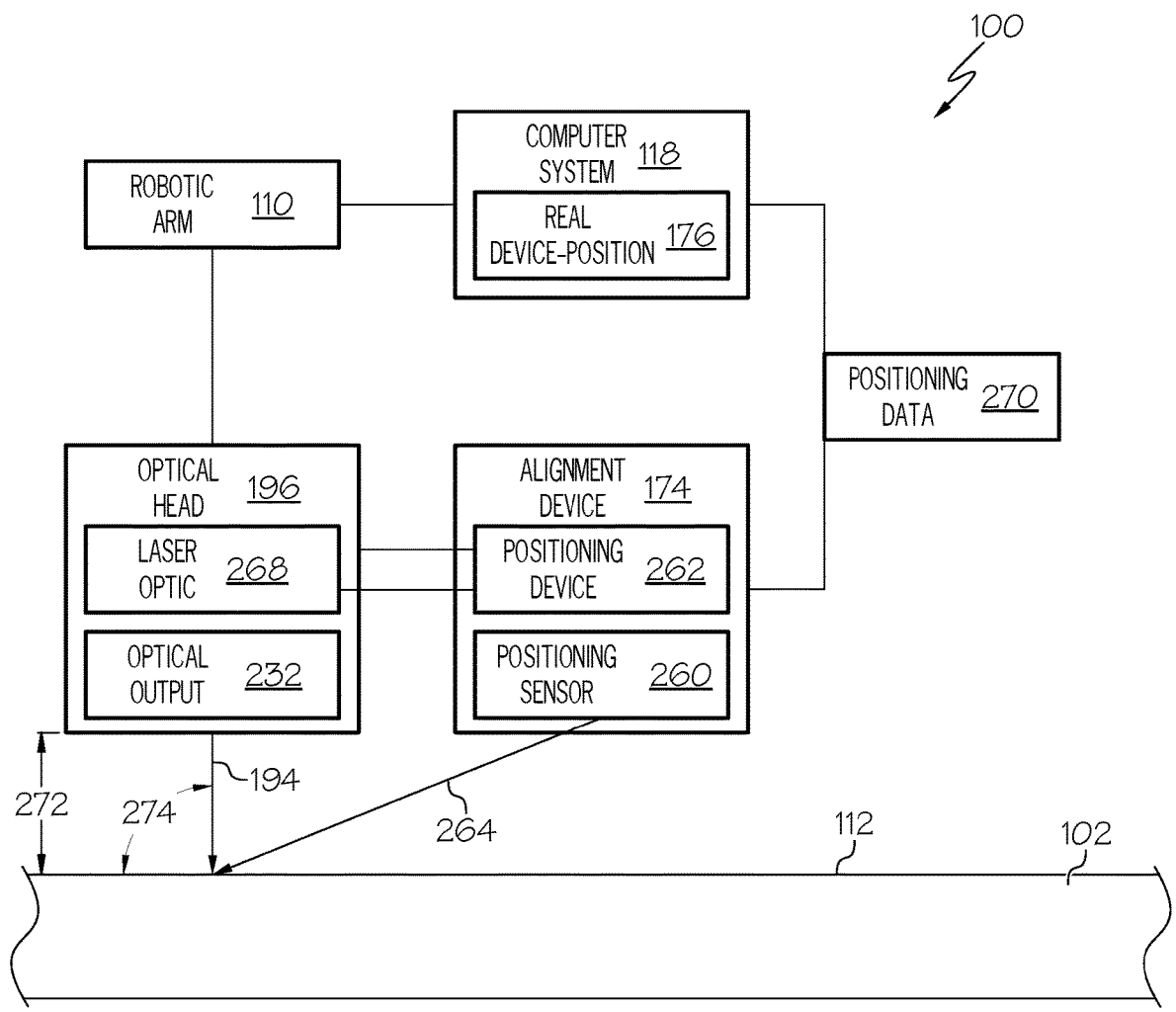
FIG. 8 is a schematic block diagram of an example of a portion of the system including an alignment device.

In one or more examples, the computer system 118 includes a motion-control module 120. The motion-control module 120 is configured to control movement of the laser light 194 relative to the surface 112 of the structure 102. For example, the motion-control module 120 is configured to provide instructions to the robotic arm 110 to move the optical head 196 to a desired position (e.g., three-dimensional location and angular orientation) relative to the surface 112 of the structure 102 such that the laser light 194 transmitted from the optical head 196 has a predetermined offset distance 272 (e.g., as shown in FIG. 8) and a predetermined impingement angle 274. In one or more examples, the predetermined offset distance 272 between the optical output 232 (FIG. 8) of the optical head 196 locates a focal point of the laser light 194 (e.g., the generation laser light 202 and/or the detection laser light 204) on the surface 112 of the structure 102. In one or more examples, the predetermined impingement angle 274 (FIG. 8) of the laser light 194 (e.g., the generation laser light 202 and/or the detection laser light 204) is normal to the surface 112 of the structure 102.

In one or more examples, the motion-control module 120 is configured to provide instructions to the movement system 240 to control movement of the transducer ultrasound device 140 (e.g., FIGS. 4 and 5) relative to the structure 102. In one or more examples, the motion-control module 120 is configured to provide instructions to the movement system 240 to control movement of the laser light transmitted from the second laser ultrasound device 150 (e.g., FIGS. 6 and 7).

In one or more examples, the computer system 118 includes a motion-tracking module 122. The motion-tracking module 122 is configured determine when the optical head 196 and, thus, the laser light 194 is at the inspection location 116. For example, the motion-tracking module 122 is configured to receive positional information for the robotic arm 110 relative to the structure 102, such as of a tool center point of the robotic arm 110 that corresponds to the position (e.g., location and angular orientation) of the laser light 194 (FIG. 1) transmitted onto the surface 112 of the structure 102. In one or more examples, the motion-tracking module 122 is configured to generate the activation signal 170 and to transmit the activation signal 170 to the multiplex controller 114 in response to the positional information for the robotic arm 110 indicating that the laser light 194 is at the inspection location 116. As such, the activation signal 170 is triggered by the position of the optical head 196 relative to the surface 112 of the structure 102. In one or more examples, the activation signal 170 is based on the 3D model 164 of the structure 102 (e.g., as shown in FIG. 2).

In one or more examples, the motion-tracking module 122 is configured determine when the transducer ultrasound device 140 (e.g., FIGS. 4 and 5) is at the inspection location 116 (e.g., FIG. 4) or the second inspection location 148 (e.g., FIG. 5). For example, the motion-tracking module 122 is configured to receive positional information for the movement system 240 that corresponds to the position of the transducer ultrasound device 140 relative to the structure 102.

In one or more examples, the motion-tracking module 122 is configured determine when the laser light transmitted from the second laser ultrasound device 150 (e.g., FIGS. 6 and 7) is at the inspection location 116 (e.g., FIG. 6) or the third inspection location 158 (e.g., FIG. 7). For example, the motion-tracking module 122 is configured to receive positional information for the movement system 240 that corresponds to the position of the laser light transmitted onto the structure 102.

In one or more examples, the computer system 118 includes a path-planning module 162. The path-planning module 162 is configured to generate the scan path 160 for movement of the laser light 194 (FIG. 1) across the surface 112 of the structure 102. In one or more examples, the scan path 160 is generated based on a three-dimensional model 164 of the structure 102. In one or more examples, the scan path 160 is a preplanned path based on the three-dimensional model 164 of the structure 102.

In one or more examples, the three-dimensional model 164 of the structure 102 is generated by any one of a variety of different methods. In one or more examples, the three-dimensional model 164 is a nominal model representative of a design geometry of the structure 102. For example, the three-dimensional model 164 is generated using a computer-aided design (CAD) tool or software program that is implemented on a computer, such as the computer system 118.

In one or more examples, the path-planning module 162 is configured to determine a trigger location 166 along the scan path 160. The trigger location 166 corresponds to the inspection location 116 of the structure 102. In one or more examples, the path-planning module 162 determines a plurality of trigger locations 166 along the scan path 160 that correspond to a plurality of inspection locations. In one or more examples, the path-planning module 162 sets the plurality of trigger locations 166 at predetermined intervals, such as at predetermined distance intervals. For example, each one of the trigger locations 166 may be set every 2 millimeters (mm), every 4 mm, etc.

The path-planning module 162 is also configured to determine an initial device-position 168 of the optical head 196 of the laser ultrasound device relative to the surface 112 of the structure 102 at the inspection location 116 for generation of the ultrasonic waves 106 within the structure 102 and generation of the array of ultrasound data 108. For example, the path-planning module 162 determines the initial device-position 168 (e.g., location and angular orientation) of the optical head 196 relative to the surface 112 of the structure 102 at the trigger location 166 that is a proper or appropriate position such that the optical head 196 is at the predetermined offset distance 272 (FIG. 8) relative to the surface 112 and the laser light 194 is at the predetermined impingement angle 274 (FIG. 8) relative to the surface 112.

The initial device-position 168 is a relatively precise and accurate position of the optical head 196 of the laser ultrasound device 104 relative to the surface 112. In one or more examples, the precision and accuracy of the initial device-position 168 is produced by 3D modeling creation of a robot motion path (e.g., the scan path 160 shown in FIG. 1). For example, the robot motion plan is created from a 3D model (e.g., the 3D model 164 shown in FIG. 2) using a vector software. The initial device-position 168 of the optical head 196 of the laser ultrasound device 104, as determined by the path-planning module 162 and/or controlled by the motion-control module 120, positions the laser ultrasound device 104 at an initial working position that is within a predetermined threshold of a known and/or desired orientation and/or offset relative to the surface 112 of the structure 102. In one or more examples, the initial device-position 168 of the optical head 196 of the laser ultrasound device 104 is a position that is within +/−3 degrees of the known orientation relative to the surface 112 of the structure 102 (e.g., of the desired impingement angle 274) and, thereby, may also be referred to herein as a "precise" position. This precise and accurate initial positioning of the optical head 196 of the laser ultrasound device 104 relative to the surface 112 becomes an enabler for the system 100.

In one or more examples, the motion-control module 120 uses the scan path 160 and the initial device-position 168 to control movement of the optical head 196 of the laser ultrasound device 104. For example, the motion-control module 120 instructs the robotic arm 110 to move the optical head 196 over the surface 112 of the structure 102 such that the laser light 194 moves across the surface 112 along the scan path 160. The motion-control module 120 uses the initial device-position 168 to instruct the robotic arm 110 to appropriately position the optical head 196 relative to the surface 112 at each one of the trigger locations 166 such that the predetermined offset distance 272 and the predetermined impingement angle 274 are maintained (e.g., are constant) at each one of the trigger locations 166 as the optical head 196 and, thus, the laser light 194 move along the scan path 160.

In one or more examples, the motion-tracking module 122 uses the trigger location 166 to determine when the optical head 196 of the laser ultrasound device 104 is at the inspection location 116 and is configured to transmit the activation signal 170 to the multiplex controller 114 when the optical head 196 is at the inspection location 116. In one or more examples, the motion-tracking module 122 uses positional information provided in response to movement of the robotic arm 110 to track the optical head 196 as it moves along the scan path 160. When the positional information for the robotic arm 110 indicates that the optical head 196 is at the trigger location 166, the motion-tracking module 122 transmits the activation signal 170 to the multiplex controller 114. For example, the trigger locations 166 are spaced at predetermined interval distances relative to each other along the scan path 160. When the position information for the robotic arm 110 indicates that the optical head 196 has moved the predetermined interval distance, the activation signal 170 is transmitted to the multiplex controller 114.

In one or more examples, movement and/or operation of an additional, or secondary, ultrasonic inspection device (e.g., the transducer ultrasound device 140 and/or the second laser ultrasound device 150) is controlled in a manner or by a technique that is substantially the same as control of the movement and/or operation of the laser ultrasound device 104, described herein above. For example, end of arm tool (EOAT) positioning of a robotic movement system (e.g., movement system 240 and/or robotic arm 110) is used to control the position, location, orientation, and movement of each one of the multiple ultrasonic inspection devices (e.g., the laser ultrasound device 104, the transducer ultrasound device 140, and/or the second laser ultrasound device 150).

In one or more examples, the computer system 118 includes an inspection module 124 configured to process the array of ultrasound data 108 to inspect, evaluate, or test the structure 102 at the inspection location 116. In one or more examples, the inspection module 124 is configured to process the array of ultrasound data 108 and any other ultrasound data, such as the array of second ultrasound data 142 (FIG. 4), the array of third ultrasound data 146 (FIG. 5), the array of fourth ultrasound data 152 (FIG. 6), and the array of fifth ultrasound data 156 (FIG. 7) to generate information about the structure 102. The information characterizes the structure 102 and includes, but is not limited to, a thickness of the structure 102, a material composition of the structure 102, an indication of whether any undesired inconsistencies or anomalies are present on and/or in the structure 102, and/or other types of information, parameters, properties, and/or characteristics of the structure 102, such as porosity. The information may be output and/or displayed in any one of various forms, such as an A-Scan, a B-Scan, a C-Scan, a frequency image, a graphical indicator, or another form.

Referring still to FIG. 2, in one or more examples, the system 100 includes a profiler 172. The profiler 172 is configured to generate data that is used to generate the three-dimensional model 164 of the structure 102. In one or more examples, an "as-built" geometry of the structure 102 being inspected may vary from the design geometry and, thus, from the nominal model. As such, utilization of the profiler 172 provides a more accurate representation of the geometry of the structure 102 when generating the scan path 160. In one or more examples, the scan path 160 is dynamically calculated based on the three-dimensional model 164 generated based on the profiler data.

In one or more examples, profiler 172 generates three-dimensional point cloud data that is provided to a computer, such as the computer system 118, and that is used to generate the three-dimensional model 164 of the structure 102. In one or more examples, the profiler 172 includes, or takes the form of, any suitable sensor device that is capable of generating three-dimensional data representative of the "as-built" geometry of the surface 112 of the structure 102. For example, the profiler 172 includes at least one of a laser profiler, a laser scanner, a structured light scanner, a camera, a stereo vision system, and the like.

Referring now to FIG. 2 and FIG. 8, which schematically illustrates an example of a portion of the system 100 utilizing an alignment device 174 to position the laser light 194 on the surface 112 of the structure 102. In one or more examples, the system 100 includes the alignment device 174. The alignment device 174 is configured to determine a real device-position 176 (FIG. 2) of the laser ultrasound device 104 relative to the surface 112 of the structure 102. The real device-position 176 refers to the actual position of the optical head 196 of the laser ultrasound device 104 relative to the surface 112, for example, following initial positioning of the optical head 196, and, thereby, may also be referred to herein as an actual device-position. The alignment device 174 is further configured to modify at least one operating parameter of the laser ultrasound device 104 based on the real device-position 176.

In one or more examples, the motion-control module 120 performs initial positioning of laser light 194 relative to the surface 112 of the structure 102 by providing movement instructions to the robotic arm 110 to position the optical head 196 to the initial device-position 168. The alignment device 174 performs final positioning of the laser light 194 relative to the surface 112 of the structure 102 such that the laser light 194 is within the desired working tolerance for the inspection operation. For example, the alignment device 174 modifies at least one operating parameter of the optical head 196 such that the laser light 194 is within approximately +/−2 degrees of the desired impingement angle 274 (e.g., normal to the surface 112) and the laser light 194 is within +/−2.5 mm of the desired offset distance 272.

As illustrated in FIG. 8, in one or more examples, the alignment device 174 includes a positioning sensor 260 and a positioning device 262. The positioning sensor 260 is configured to direct positioning light 264 onto the surface 112 of the structure 102, such as onto an area of the surface 112 surrounding the inspection location 116. The positioning sensor 260 is further configured to receive a portion of the positioning light 264 that is reflected from the surface 112 back to the positioning sensor 260. A spatial position (e.g., three-dimensional location and angular orientation) of the surface 112 surrounding the inspection location 116 is determined (e.g., estimated or measured) based on an evaluation of the reflected portion of the positioning light 264 collected by the positioning sensor 260.

In one or more examples, the positioning sensor 260 uses any one of various three-dimensional scanning techniques, such as time-of-flight or triangulation, to determine the position of the positioning sensor 260 relative to the surface 112 of the structure 102. For example, the positioning sensor 260 includes at least one of three-dimensional scanner, a laser scanner, a structured light scanner, and the like. In one or more examples, the positioning sensor 260 is configured to generate position data 270 (e.g., a plurality of data points) representative of a three-dimensional position of an area of the surface 112 illuminated by the positioning light 264.

The position data 270 is used to computationally determine the position of the illuminated portion of the surface 112 relative to the positioning sensor 260. In one or more examples, the alignment device 174 is coupled to the end of the robotic arm 110 (e.g., as shown in FIG. 1) such that the position of the optical head 196 relative to the surface 112 can be computationally determined based on the position of positioning sensor 260 relative to the surface 112. As such, the real device-position 176 is determined by the computer system 118 based on the acquired position data 270. The real device-position 176 serves as positional feedback used to correct for the offset distance 272 between the optical output 232 of the optical head 196 and the impingement angle 274 of the laser light 194 relative to the surface 112 being outside of an allowable tolerance during the inspection operation.

In one or more examples, the positioning device 262 is configured to correct for the offset distance 272 between the optical output 232 of the optical head 196 being outside of an allowable tolerance by selectively locating a focal point of the laser light 194 on the surface 112. In one or more examples, the positioning device 262 is configured to correct for the impingement angle 274 of the laser light 194 being outside of an allowable tolerance by selectively orienting a projection angle of the laser light 194 from the optical output 232.

Selective location of the focal point of the laser light 194 and/or selective angular orientation of the projection angle of the laser light 194 may be achieved by any one of various techniques or combination of techniques. In one or more examples, the optical head 196 includes at least one laser optic 268 associated with the laser light 194. For examples, the laser optic 268 includes one or more optical elements associated with transmission of the generation laser light 202 and one or more optical elements associated with transmission of the detection laser light 204. In one or more examples, the positioning device 262 is configured to manipulate the laser optic 268 to selectively adjust a focal depth of the laser light 194 such that the focal point of the laser light 194 is on the surface 112 to correct for an out of tolerance offset distance between the optical output 232 of the optical head 196 and the surface 112 of the structure 102. In one or more examples, the positioning device 262 is configured to manipulate the laser optic 268 to selectively adjust the projection angle of the laser light 194 such that the laser light 194 is normal to the surface 112 to correct for an out of tolerance impingement angle between the laser light 194 and the surface 112 of the structure 102.

Alternatively, in one or more examples, the positioning device 262 is coupled to the optical head 196 and is configured to perform minor adjustments to the location and/or angular orientation of the optical head 196 to correct for offset distance 272 between the optical output 232 of the optical head 196 and the surface 112 of the structure 102 that is an out of tolerance and/or to correct for the impingement angle 274 between the laser light 194 and the surface 112 of the structure 102 that is out of tolerance.

Figure 9:
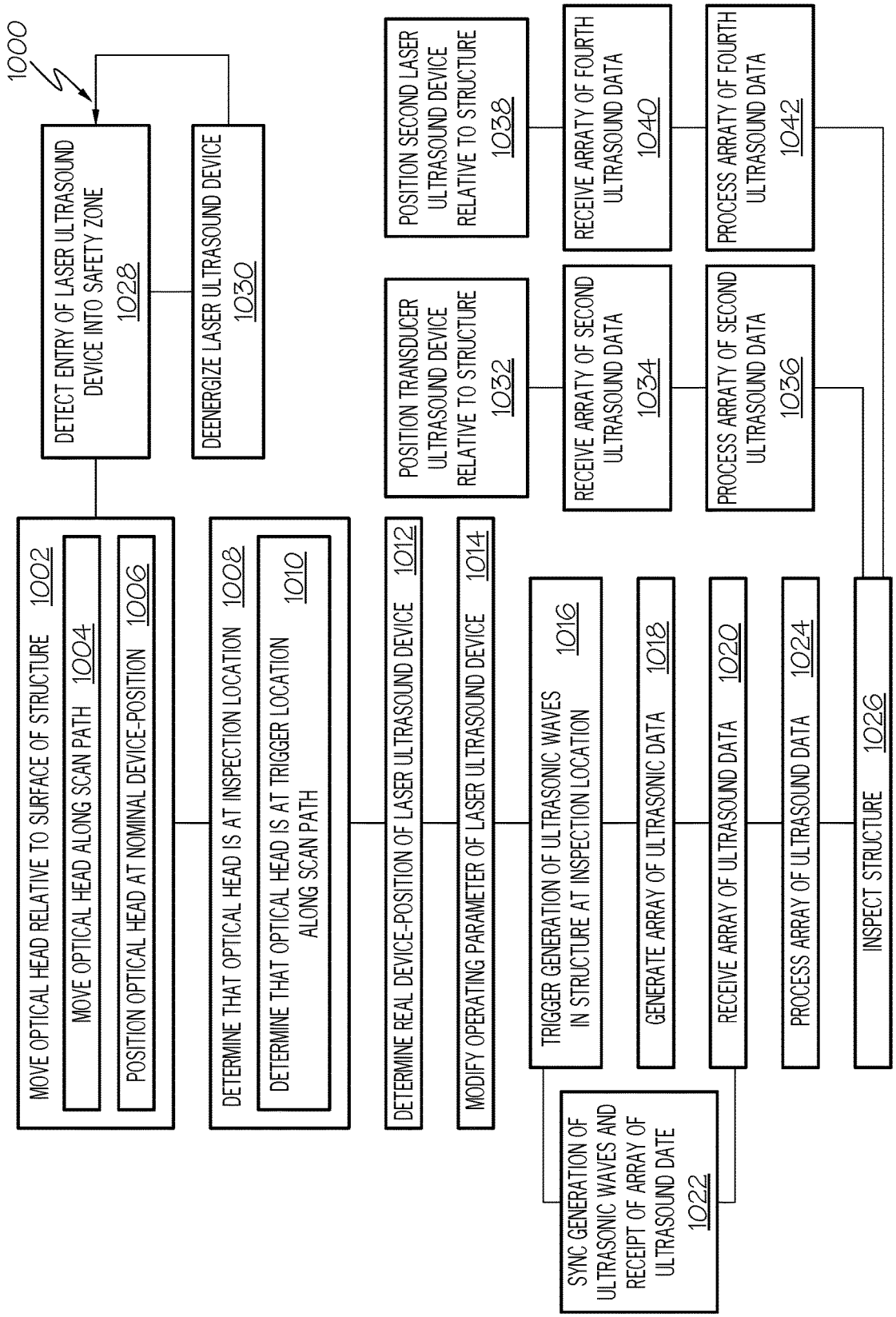
FIG. 9 is a flow diagram of an example of a method of inspecting the structure.

Referring now to FIG. 9, by way of examples, the present disclosure is directed to a method 1000 of inspecting the structure 102. In one or more examples, implementations of the method 1000 utilize one or more examples of the system 100 (e.g., as shown in FIGS. 1-8) to inspect the structure 102. The method 1000 enables automated laser ultrasonic nondestructive inspecting and evaluating of the structure 102 and provides increased capabilities to a laser ultrasonic inspection device.

Referring generally to FIGS. 1 and 2 and particularly to FIG. 9, in one or more examples, the method 1000 includes a step of (block 1002) moving the optical head 196 of the laser ultrasound device 104 relative to the surface 112 of the structure 102. In one or more examples, the robotic arm 110 is used to move the optical head 196. The optical head 196 is configured to transmit the laser light 194. The laser light 194 (e.g., the generation laser light 202) is configured to generate the ultrasonic waves 106 within the structure 102. The laser light 194 (e.g., the detection laser light 204) is further configured further detect the response (208) to the ultrasonic waves 106.

In one or more examples, according to the method 1000, the step of (block 1002) moving the optical head 196 includes a step of (block 1004) moving the optical head 196 along the scan path 160 based on the three-dimensional model 164 of the structure 102. The step of (block 1002) moving the optical head 196 further includes a step of (block 1006) positioning the optical head 196 at the initial device-position 168 relative to the surface 112 of the structure 102 for generation of the ultrasonic waves 106 within the structure 102 and generation of the array of ultrasound data 108.

In one or more examples, the method 1000 includes a step of generating the scan path 160 for the laser light 194 to move across the surface 112 of the structure 102. For example, the scan path 160 is generated based on the three-dimensional model 164 of the structure 102.

In one or more examples, the method 1000 includes a step of (block 1008) determining that the optical head 196 is at the inspection location 116 of the structure 102. In one or more examples, according to the method 1000, the step of (1008) determining that the optical head 196 is at the inspection location 116 includes a step of (block 1010) determining that the optical head 196 is at the trigger location 166 along the scan path 160 that corresponds to the inspection location 116.

In one or more examples, the method 1000 includes a step of determining the trigger location 166 along the scan path 160 that corresponds to the inspection location of the structure 102.

Referring generally to FIGS. 2 and 8 and particularly to FIG. 9, in one or more examples, the method 1000 includes a step of (block 1012) determining the real device-position 176 of the optical head 196 relative to the surface 112 of the structure 102. The method 1000 further includes a step of (block 1014) modifying at least one operating parameter of the optical head 196 based on the real device-position 176.

Referring generally to FIGS. 1 and 2 and particularly to FIG. 9, in one or more examples, the method 1000 includes a step of (block 1016) triggering generation of the ultrasonic waves 106 within the structure 102 at the inspection location 116 of the structure 102. In one or more examples, the multiplex controller 114 is used to trigger generation of the ultrasonic waves 106. The ultrasonic waves 106 are generated within the structure 102 by transmitting the laser light 194 (e.g., the generation laser light 202) onto the surface 112 of the structure 102 at the inspection location 116.

In one or more examples, the method 1000 includes a step of (block 1018) generating of the array of ultrasound data 108 representative of the ultrasonic waves 106 based on the response 208. The response 208 is formed by transmitting the laser light 194 (e.g., the detection laser light 204) onto the surface 112 of the structure 102 at the inspection location 116 and detecting the returned portion of the laser light 194 (e.g., the detection laser light 204).

In one or more examples, the method 1000 includes a step of (block 1020) receiving the array of ultrasound data 108 for the inspection location 116. In one or more examples, the multiplex controller 114 receives the array of ultrasound data 108 from the laser ultrasound device 104 (e.g., from the detection laser unit 200).

In one or more examples, the method 1000 includes a step of (block 1022) syncing the step of (block 1016) triggering generation of the ultrasonic waves 106 and the step of (block 1020) receiving the array of ultrasound data 108. In one or more examples, the multiplex controller 114 syncs generation of the ultrasonic waves 106 and receipt of the array of ultrasound data 108.

In one or more examples, the method 1000 includes a step of (block 1024) processing the array of ultrasound data 108. The array of ultrasound data 108 is transmitted from the multiplex controller 114 to the computer system 118 for processing. In one or more examples, the array of ultrasound data 108 is processed to inspect, evaluate, or test the structure 102 at the inspection location 116. The method 1000 includes a step of (block 1026) inspecting the structure 102.

Referring generally to FIG. 3 and particularly to FIG. 9, in one or more examples, the method 1000 includes a step of (block 1028) detecting entry of the optical head 196 into the safety zone 138 and a step of (block 1030) automatically deenergizing the laser ultrasound device 104 in response to detecting entry of the optical head 196 into the safety zone 138.

Referring generally to FIGS. 2 and 4 and particularly to FIG. 9, in one or more examples, the method 1000 includes a step of (block 1032) positioning the transducer ultrasound device 140 relative to the structure 102. The transducer ultrasound device 140 is configured to generate the array of second ultrasound data 142 representative of the ultrasonic waves 106. In one or more examples, the method 1000 includes a step of (block 1034) receiving the array of second ultrasound data 142 for the inspection location 116. In one or more examples, the multiplex controller 114 receives the array of second ultrasound data 142. In one or more examples, the method 1000 includes a step of (block 1036) processing the array of second ultrasound data 142 to inspect the structure 102 at the inspection location 116. In one or more examples, the array of ultrasound data 108 and the array of second ultrasound data 142 are integrated and processed together to inspect, evaluate, or test the structure 102 at the inspection location 116 (e.g., block 1026).

Referring generally to FIGS. 2 and 5, in one or more examples, the transducer ultrasound device 140 is configured to generate the second ultrasonic waves 144 within the structure 102. The transducer ultrasound device 140 is configured to generate the array of third ultrasound data 146 representative of the second ultrasonic waves 144. In one or more examples, the method 1000 includes a step of receiving the array of third ultrasound data 146 for the second inspection location 148. In one or more examples, the multiplex controller 114 receives the array of third ultrasound data 146. In one or more examples, the method 1000 includes a step of processing the array of third ultrasound data 146 to inspect the structure 102 at the second inspection location 148. In one or more examples, the array of ultrasound data 108 and the array of third ultrasound data 146 are integrated and processed together to inspect, evaluate, or test the structure 102 at the inspection location 116 (e.g., block 1026).

Referring generally to FIGS. 2 and 6 and particularly to FIG. 9, in one or more examples, the method 1000 includes a step of (block 1038) positioning the second laser ultrasound device 150 relative to the structure 102. The second laser ultrasound device 150 is configured to generate the array of fourth ultrasound data 152 representative of the ultrasonic waves 106. In one or more examples, the method 1000 includes a step of (block 1040) receiving the array of fourth ultrasound data 152 for the inspection location 116. In one or more examples, the multiplex controller 114 receives the array of fourth ultrasound data 152. In one or more examples, the method 1000 includes a step of (block 1042) processing the array of fourth ultrasound data 152 to inspect the structure 102 at the inspection location 116. In one or more examples, the array of ultrasound data 108 and the array of fourth ultrasound data 152 are integrated and processed together to inspect, evaluate, or test the structure 102 at the inspection location 116 (e.g., block 1026).

Referring generally to FIGS. 2 and 7, in one or more examples, the second laser ultrasound device 150 is configured to generate the third ultrasonic waves 154 within the structure 102. The second laser ultrasound device 150 is configured to generate the array of fifth ultrasound data 156 representative of the third ultrasonic waves 154. In one or more examples, the method 1000 includes a step of receiving the array of fifth ultrasound data 156 for the third inspection location 158. In one or more examples, the multiplex controller 114 receives the array of fifth ultrasound data 156. In one or more examples, the method 1000 includes a step of processing the array of fifth ultrasound data 156 to inspect the structure 102 at the third inspection location 158. In one or more examples, the array of ultrasound data 108 and the array of fifth ultrasound data 156 are integrated and processed together to inspect, evaluate, or test the structure 102 at the inspection location 116 (e.g., block 1026).

Figure 10:
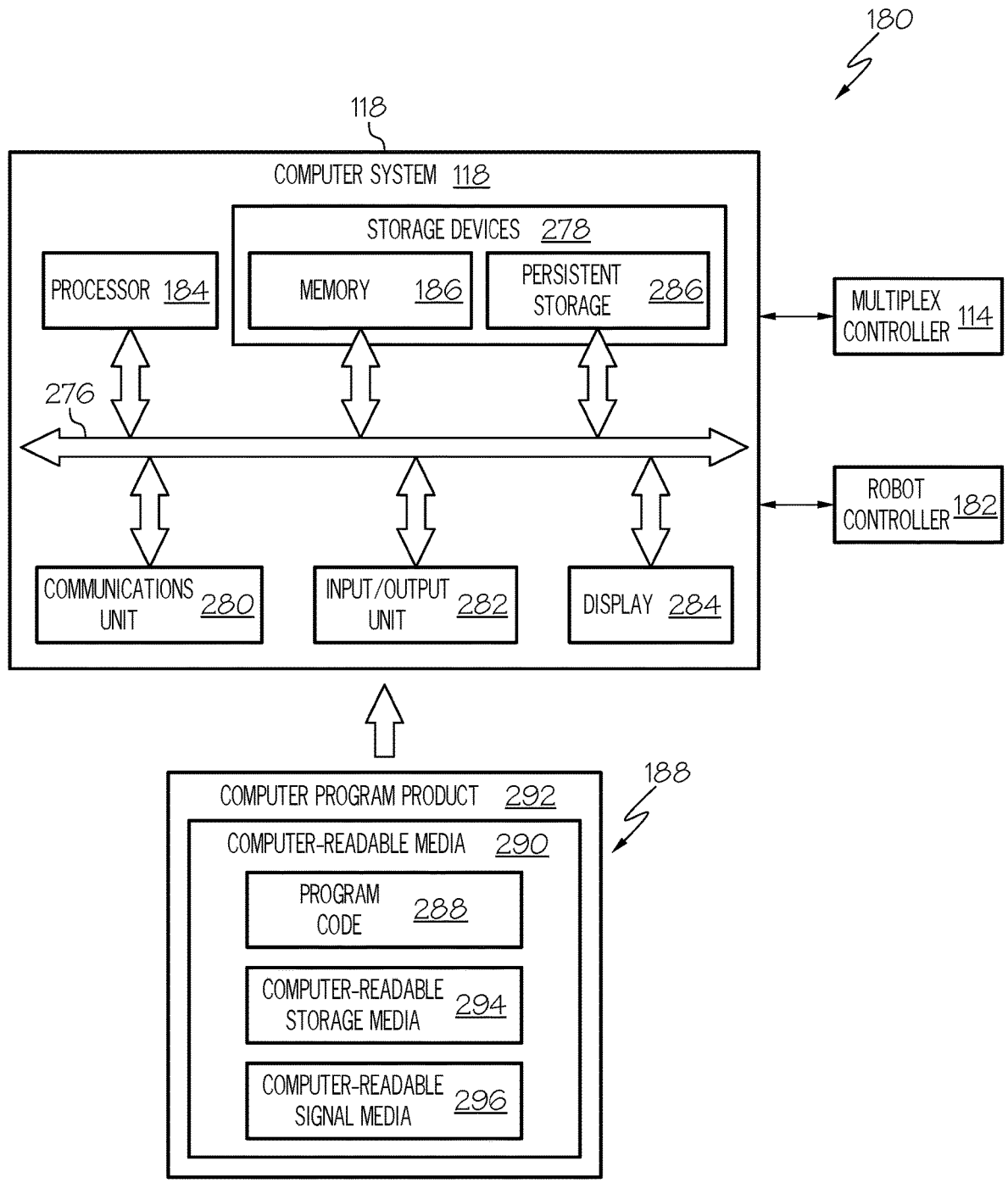
FIG. 10 is a schematic block diagram of an example of a robotic control system for automatically inspecting the structure.

Referring now to FIG. 10, by way of examples, the present disclosure is also directed to a robotic control system 180 for automatically inspecting the structure 102. In one or more examples, the robotic control system 180 is implemented using the system 100 (e.g., shown in FIGS. 1-8) and/or in accordance with the method 1000 (e.g., shown in FIG. 9).

In one or more examples, the robotic control system 180 includes a robot controller 182. The robot controller 182 is coupled to and is in communication with the robotic arm 110. The robot controller 182 is configured to control a position of the robotic arm 110.

In one or more examples, the robotic control system 180 includes the multiplex controller 114. The multiplex controller 114 is coupled to the laser ultrasound device 104. The multiplex controller 114 is configured to control the laser ultrasound device 104. In one or more examples, the multiplex controller 114 is also coupled to and is in communication with the robotic arm 110, such as via the robot controller 182.

In one or more examples, the robotic control system 180 includes the computer system 118. The computer system 118 is coupled to and is in communication with the robot controller 182. The computer system 118 is coupled to and is in communication with the multiplex controller 114. The computer system 118 includes at least one processor 184 and memory 186 storing at least one computer-readable program 188 that, in response to execution by the at least one processor 184, causes the computer system 118 to perform operations.

In one or more examples, in response to execution by the at least one processor 184, the program 188 causes the computer system 118 to generate the scan path 160 for movement of the optical head 196 of the laser ultrasound device 104 across the surface 112 of the structure 102 based on the three-dimensional model 164 of the structure 102.

In one or more examples, in response to execution by the at least one processor 184, the program 188 causes the computer system 118 to determine the trigger location 166 along the scan path 160 the corresponds to the inspection location 116 of the structure 102.

In one or more examples, in response to execution by the at least one processor 184, the program 188 causes the computer system 118 to instruct the robot controller 182 to move the optical head 196 of the laser ultrasound device 104 along the scan path 160 relative to the surface 112 of the structure 102 using the robotic arm 110.

In one or more examples, in response to execution by the at least one processor 184, the program 188 causes the computer system 118 to determine when the laser ultrasound device 104 is at the trigger location 166.

In one or more examples, in response to execution by the at least one processor 184, the program 188 causes the computer system 118 to instruct the robot controller 182 to position the optical head 196 of the laser ultrasound device 104 at the initial device-position 168 relative to the surface 112 of the structure 102 at the trigger location 166.

In one or more examples, in response to execution by the at least one processor 184, the program 188 causes the computer system 118 to instruct the multiplex controller 114 to trigger generation of the ultrasonic waves 106 within the structure 102 at the inspection location 116 using the laser ultrasound device 104. In response to execution by the at least one processor 184, the program 188 further causes the computer system 118 to receive the array of ultrasound data 108, representative of the ultrasonic waves 106, from the laser ultrasound device 104.

In one or more examples, in response to execution by the at least one processor 184, the program 188 causes the computer system 118 to process the array of ultrasound data 108 provided from the multiplex controller 114 to inspect the structure 102.

As illustrated in FIG. 10, the robotic control system 180 utilizes a data processing system to implement the computer system 118. The computer system 118 is used to process data, such as positional data for the robotic arm 110, positional data for the optical head 196, and ultrasound data from the laser ultrasound device 104 and any other ultrasound inspection device coupled to the multiplex controller 114, as described above. In one or more examples, the computer system 118 includes communications framework 276, which provides communications between the processor 184, storage devices 278, a communications unit 280, an input/output unit 282, and a display 284. In one or more examples, the communications framework 276 is implemented as a bus system.

The processor 184 is configured to execute instructions for software to perform a number of operations. In one or more examples, the processor 184 includes a number of processor units, a multi-processor core, and/or some other type of processor, depending on the implementation. In one or more examples, the processor 184 takes the form of a hardware unit, such as a circuit system, an application specific integrated circuit (ASIC), a programmable logic device, or some other suitable type of hardware unit.

Instructions for the operating system, applications, and/or programs run by the processor 184 are located in the storage devices 278. The storage devices 278 are in communication with the processor 184 through the communications framework 276. As used herein, a storage device, also referred to as a computer-readable storage device, is any piece of hardware capable of storing information on a temporary and/or permanent basis. This information may include, but is not limited to, data, program code, and/or other information.

The memory 186 and persistent storage 286 are examples of the storage devices 278. In one or more examples, the memory 186 takes the form of a random access memory or some type of volatile or non-volatile storage device. The persistent storage 286 includes any number of components or devices. For example, the persistent storage 286 may include a hard drive, a flash memory, a rewritable optical disk, a rewritable magnetic tape, or some combination of the above. The media used by the persistent storage 286 may or may not be removable.

The communications unit 280 enables the computer system 118 to communicate with the multiplex controller 114, the robot controller 182, and other data processing systems and/or devices. The communications unit 280 may provide communications using physical and/or wireless communications links.

The input/output unit 282 enables input to be received from and output to be sent to the multiplex controller 114, the robot controller 182, and other devices connected to computer system 118.

The display 284 is configured to display information to a user. For example, the display 284 displays the information characterizing the structure 102 after processing and evaluating the array of ultrasound data 108 (FIG. 2) and any additional ultrasound data.

In one or more examples, one or more operations of the different examples of the system 100 (e.g., FIGS. 1-8) and/or one or more of the operational steps of the different examples of the method 1000 (e.g., FIG. 9) are performed by the processor 184 using computer-implemented instructions. These instructions may be referred to as program code, computer usable program code, or computer readable program code, and may be read and executed by one or more processor units in the processor 184.

In these examples, program code 288 is located in a functional form on a computer-readable media 290, which is selectively removable, and may be loaded onto or transferred to the computer system 118 for execution by the processor 184. The program code 288 and the computer-readable media 290 together form a computer program product 292. In one or more examples, the computer-readable media 290 may be computer-readable storage media 294 or computer readable signal media 296.

Throughout the present disclosure, various components of the system 100, the multiplex controller 114, and/or the computer system 118 are described as modules. For the purpose of the present disclosure, the term "module" includes hardware, software or a combination of hardware and software. As an example, a module may include one or more circuits configured to perform or execute the described functions. As another example, a module includes a processor, a storage device (e.g., a memory), and computer-readable storage medium having instructions that, when executed by the processor causes the processor to perform or execute the described functions. In one or more examples, a module takes the form of the program code 288 and the computer-readable media 290 together forming the computer program product 292.

Figure 11:
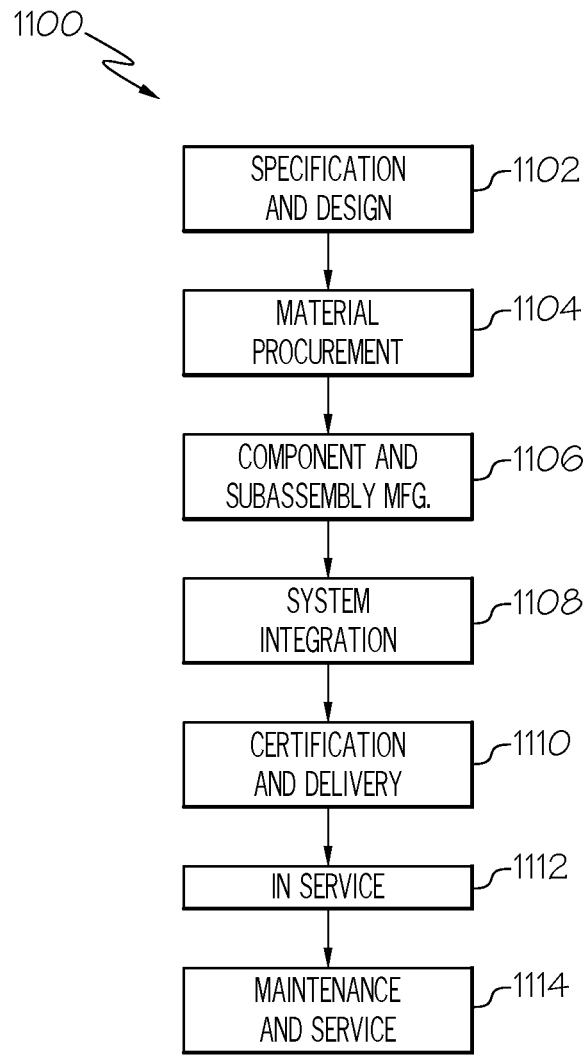
FIG. 11 is a schematic illustration of an example of an aircraft.
Figure 12:
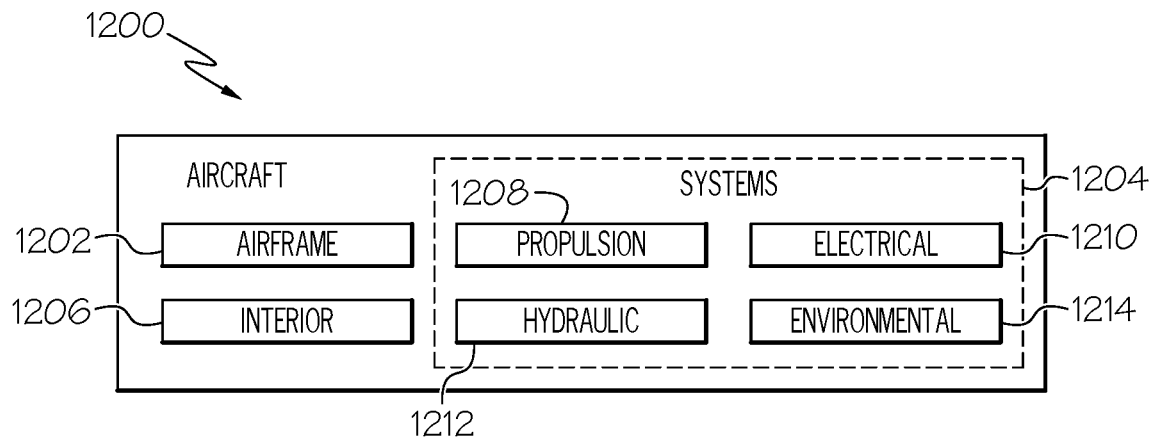
FIG. 12 is a flow diagram of an aircraft manufacturing and service methodology.

Referring now to FIGS. 11 and 12, examples of the system 100, the method 1000, and the robotic control system 180 may be related to, or used in the context of, an aircraft manufacturing and service method 1100, as shown in the flow diagram of FIG. 11 and the aircraft 1200, as schematically illustrated in FIG. 12. For example, the aircraft 1200 and/or the aircraft production and service methodology 1100 may utilize the structure 102 that is inspected according to the method 1000 and/or using the system 100 and/or the robotic control system 180 described herein and illustrated in FIGS. 1-10.

The present disclosure recognizes that composite structures can be advantageous in the manufacture of aircraft to decrease the weight of the aircraft and provide longer service life for various components of the aircraft. In manufacturing composite structures, layers of composite material are typically laid up on a tool. Often, each layer of composite material includes a fiber sheet that is infused or pre-impregnated with a matrix material (commonly referred to as prepreg). The different layers of composite material may be laid up in different orientations, and different numbers of layers may be used depending on the performance requirements of the composite structure being manufactured. In certain circumstances, inconsistencies may be introduced to the composite structure during manufacturing or during the service life of the composite structure. Due to the spacing of the layers that make up the composite structure, inspection of the composite structure may be more difficult than desired for some locations or some types of inconsistencies. Additionally, some inconsistencies may not be detectable using conventional non-destructive inspecting techniques. In one or more examples, the structure 102 is a composite structure. The examples of the system 100, the method 1000, and the robotic control system 180 improve the capabilities of laser ultrasound inspection and transducer ultrasound inspection for inspecting and evaluating the structure 102.

Referring to FIG. 12, examples of the aircraft 1200 may include an airframe 1202 having the interior 1206. The aircraft 1200 also includes a plurality of high-level systems 1204. Examples of the high-level systems 1204 include one or more of a propulsion system 1208, an electrical system 1210, a hydraulic system 1212, and an environmental system 1214. In other examples, the aircraft 1200 may include any number of other types of systems, such as a communications system, a flight control system, a guidance system, a weapons system, and the like. In one or more examples, the structure 102 inspected according to the method 1000 and/or using the system 100 and/or the robotic control system 180 forms a component of the airframe 1202, such as a wing, a fuselage, a stringer, and the like.

Referring to FIG. 11, during pre-production, the method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the method 1100 illustrated in FIG. 11 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the system 100, the method 1000, and/or the robotic control system 180 shown and described herein may be employed during any one or more of the stages of the manufacturing and service method 1100 shown in the flow diagram illustrated by FIG. 11. In an example, inspection of the structure 102 in accordance with the method 1000 and/or using the system 100 and/or the robotic control system 180 may form a portion of component and subassembly manufacturing (block 1106) and/or system integration (block 1108). Further, the structure 102 inspected in accordance with the method 1000 and/or using the system 100 and/or the robotic control system 180 may be utilized in a manner similar to components or subassemblies prepared while the aircraft 1200 is in service (block 1112). Also, the structure 102 inspected in accordance with the method 1000 and/or using the system 100 and/or the robotic control system 180 may be utilized during system integration (block 1108) and certification and delivery (block 1110). Similarly, inspection of the structure 102 in accordance with the method 1000 and/or using the system 100 and/or the robotic control system 180 may be utilized, for example and without limitation, while the aircraft 1200 is in service (block 1112) and during maintenance and service (block 1114).

Although an aerospace example is shown, the examples and principles disclosed herein may be applied to other industries, such as the automotive industry, the space industry, the construction industry, and other design and manufacturing industries. Accordingly, in addition to aircraft, the examples and principles disclosed herein may apply to structural component assemblies and systems and methods of making the same for other types of vehicles (e.g., land vehicles, marine vehicles, space vehicles, etc.) and stand-alone structures.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

For the purpose of the present disclosure, the terms "inspect," "inspecting," "evaluate," "evaluating", "test," "testing," and similar terms, such as in reference to inspecting, evaluating, and/or testing the structure 102, refer to nondestructive testing (NDT), nondestructive examination (NDE), nondestructive inspection (NDI), nondestructive evaluation (NDE), and other inspection techniques used to analyze and/or evaluate properties, parameters, and/or characteristics of a structure, material, or component without permanently altering or causing damage to the article being tested.

In one or more examples, the structure 102 includes, or is formed of, a number of materials. In one or more examples, the structure 102 is a composite structure formed of two or more composite materials, such as a fiber-reinforced polymer formed of a matrix material and a reinforcement material. In other examples, the structure 102 is formed of metallic materials, plastic materials, or other suitable types of materials. In one or more examples, the matrix material includes a thermoset resin (e.g., epoxy), a thermoplastic polymer (polyester, vinyl ester, nylon, etc.), or other types of matrix material. In one or more examples, the reinforcement material includes fibers (e.g., glass fibers, carbon fibers, aramid fibers, etc.) or other types of reinforcement materials. In one or more examples, the fibers are unidirectional fibers or take the form of a woven or nonwoven cloth, fabric, or tape. In one or more examples, the structure 102 is a laminate structure. The laminate structure includes, or is formed of, a plurality of material layers. In one or more examples, the structure 102 include a plurality of laminated layers of composite materials.

For the purpose of the present disclosure, the term "surface," such as in reference to the surface 112 of the structure 102, has its ordinary meaning and refers to any portion of an outer face of the structure 102 onto which the laser light 194 and/or the positioning light 264 is transmitted during the inspection operation.

For the purpose of the present disclosure, the term "inspection location," such as in reference to the inspection location 116 of the structure 102, refers to a portion of the surface 112 or a predetermined surface area of the surface 112 that is intended to be illuminated by light during the laser ultrasound testing operation at any given position along the scan path 160.

For the purpose of the present disclosure, the term "position" of an item refers to a location of the item in three-dimensional space relative to a fixed reference frame (e.g., reference frame 266 shown in FIG. 1) and an angular orientation of the item in three-dimensional space relative to the fixed reference frame.

As used herein, the phrase "a number of" refers to one or more items.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1-8, 10 and 12, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-8, 10 and 12, referred to above, need be included in every example and not all elements, features, and/or components described herein are necessarily depicted in each illustrative example. Accordingly, some of the elements, features, and/or components described and illustrated in FIGS. 1-8, 10 and 12 may be combined in various ways without the need to include other features described and illustrated in FIGS. 1-8, 10 and 12, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-8, 10 and 12, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-8, 10 and 12, and such elements, features, and/or components may not be discussed in detail herein with reference to each of FIGS. 1-8, 10 and 12. Similarly, all elements, features, and/or components may not be labeled in each of FIGS. 1-8, 10 and 12, but reference numerals associated therewith may be utilized herein for consistency.

In FIGS. 9 and 11, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 9 and 11 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the system 100, method 1000, and the robotic control system 180 have been shown and described, modifications may occur to those skilled in the art upon reading the specification. The present application includes such modifications and is limited only by the scope of the claims.

What is claimed is:

1. A system for inspecting a structure, the system comprising:
   a laser ultrasound device configured to direct laser light onto a first surface of the structure that generates ultrasonic waves within the structure and to generate an array of ultrasound data representative of a first portion of the ultrasonic waves propagating through the structure and returned to the first surface;
   a transducer ultrasound device positioned at a second surface, opposite the first surface, and configure to detect a second portion of the ultrasonic waves propagating through the structure to the second surface and to generate an array of second ultrasound data representative of the ultrasonic waves;
   a robotic arm configured to move the laser light across the surface of the structure;
   a multiplex controller coupled to the laser ultrasound device and to the transducer ultrasound device, wherein the multiplex controller is configured to trigger generation of the ultrasonic waves within the structure at an inspection location of the structure and to receive the array of ultrasound data for the inspection location from the laser ultrasound device and receive the array of second ultrasound data from the transducer ultrasound device;
   a computer system coupled to the robotic arm and to the multiplex controller, wherein the computer system comprises:

a motion-control module configured to control movement of the laser light relative to the surface of the structure;

a motion-tracking module configured determine when the laser light is at the inspection location; and inspection module configured to process the array of ultrasound data to inspect the structure at the inspection location.

2. The system of claim 1, wherein:

the multiplex controller comprises:

a trigger module configured to transmit a trigger signal to the laser ultrasound device to trigger generation of the ultrasonic waves within the structure at the inspection location; and an array receiver configured to receive the array of ultrasound data from the laser ultrasound device; and the multiplex controller is further configured to sync transmission of the trigger signal and receipt of the array of ultrasound data.

3. The system of claim 2, wherein the multiplex controller further comprises a clock configured to delay transmission of trigger signal from the trigger module by a predetermined period.

4. The system of claim 2, wherein the multiplex controller further comprises a signal conditioner module configured to modify at least one of a period, a waveform, and a voltage of the trigger signal for use by the laser ultrasound device.

5. The system of claim 4, wherein the signal conditioner module is further configured to modify the trigger signal to delay transmission of the trigger signal to the laser ultrasound device by a predetermined period.

6. The system of claim 1, further comprising a safety sensor coupled to the computer system and configured to detect entry of the laser ultrasound device into a safety zone, wherein the computer system is further configured to automatically deenergize the laser ultrasound device in response to the safety sensor detecting entry of the laser ultrasound device into the safety zone.

7. The system of claim 1, wherein:

the transducer ultrasound device is further configured to generate second ultrasonic waves within the structure and to generate an array of third ultrasound data representative of the second ultrasonic waves; and the multiplex controller is further configured to trigger generation of the second ultrasonic waves within the structure at a second inspection location of the structure and to receive the array of third ultrasound data for the second inspection location from the transducer ultrasound device.

8. The system of claim 1, further comprising further comprising a second laser ultrasound device positioned at the second surface and configure to generate an array of fourth ultrasound data representative of the second portion of the ultrasonic waves propagating through the structure to the second surface, wherein the multiplex controller is coupled to the second laser ultrasound device and is further configured to receive the array of fourth ultrasound data for the inspection location from the second laser ultrasound device.

9. The system of claim 8, wherein:

the second laser ultrasound device is further configured to generate third ultrasonic waves within the structure and to generate an array of fifth ultrasound data representative of the third ultrasonic waves; and the multiplex controller is further configured to trigger generation of the third ultrasonic waves within the structure at a third inspection location of the structure and to receive the array of fifth ultrasound data for the third inspection location from the second laser ultrasound device.

10. The system of claim 1, wherein:

the laser ultrasound device comprises an optical head coupled to the robotic arm and configured to transmit the laser light onto the surface of the structure;

the computer system further comprises a path-planning module configured to:

generate a scan path for movement of the laser light across the surface of the structure based on a three-dimensional model of the structure;

determine a trigger location along the scan path that corresponds to the inspection location; and determine an initial device-position of the optical head relative to the surface of the structure at the trigger location for generation of the ultrasonic waves within the structure and generation of the array of ultrasound data;

the motion-control module uses the scan path and the initial device-position to control movement of the optical head using the robotic arm; and the motion-tracking module uses the trigger location to determine when the optical head is at the inspection location and is configured to transmit an activation signal to the multiplex controller when the optical head is at the inspection location.

11. The system of claim 10, further comprising a laser profiler configured to generate the three-dimensional model of the structure.

12. The system of claim 10, further comprising an alignment device configured to determine a real device-position of the laser ultrasound device relative to the surface of the structure and to modify at least one operating parameter of the laser ultrasound device based on the real device-position.

13. A method of inspecting a structure, the method comprising steps of:

moving an optical head of a laser ultrasound device relative to a first surface of the structure using a robotic arm, wherein the optical head is configured to transmit laser light that is configured to generate ultrasonic waves within the structure and to detect a response to the ultrasonic waves;

determining that the optical head is at an inspection location of the structure;

triggering generation of the ultrasonic waves within the structure at the inspection location of the structure using a multiplex controller;

generating of an array of ultrasound data representative of a first portion of the ultrasonic waves propagating through the structure and returning to the first surface of the structure based on the response;

detecting a second portion of the ultrasonic waves propagating through the structure to a second surface, opposite the first surface;

generating an array of second ultrasound data representative of the second portion of the ultrasonic waves;

receiving the array of ultrasound data and the array of second ultrasound data for the inspection location by the multiplex controller; and processing the array of ultrasound data and the array of second ultrasound data to inspect the structure at the inspection location.

14. The method of claim 13, further comprising syncing the step of triggering generation of the ultrasonic waves, the step of receiving the array of ultrasound data, and the step of receiving the array of second ultrasound data using the multiplex controller.

15. The method of claim 13, further comprising:
detecting entry of the optical head into a safety zone; and
automatically deenergizing the laser ultrasound device in response to detecting entry of the optical head into the safety zone.

16. The method of claim 13, further comprising positioning a transducer ultrasound device relative to the second surface of the structure, wherein the transducer ultrasound device is configured to detect the second portion of the ultrasonic waves and to generate the array of second ultrasound data representative of the second portion of the ultrasonic waves.

17. The method of claim 13, wherein:
the step of moving the optical head of the laser ultrasound device comprises:
moving the optical head along a scan path based on a three-dimensional model of the structure; and
positioning the optical head at an initial device-position relative to the surface of the structure for generation of the ultrasonic waves within the structure and generation of the array of ultrasound data; and
the step of determining that the laser ultrasound device is at the inspection location comprises determining that the optical head is at a trigger location along the scan path that corresponds to the inspection location.

18. The method of claim 17, further comprising:
determining a real device-position of the optical head relative to the surface of the structure; and
modifying at least one operating parameter of the optical head based on the real device-position.

19. A robotic control system for automatically inspecting a structure, the robotic control system comprising:
a robot controller coupled to a robotic arm and configured to control a position of the robotic arm;
a multiplex controller coupled to a laser ultrasound device and a transducer ultrasound device and configured to control the laser ultrasound device and the transducer ultrasound device;
a safety sensor configured to generate a safety zone surrounding the robotic arm; and
a computer system coupled to the robot controller, to the multiplex controller, and to the safety sensor, the computer system comprising at least one processor and memory storing at least one computer-readable program that, in response to execution by the at least one processor, causes the computer system to:
generate a scan path for movement of an optical head of the laser ultrasound device across a first surface of the structure based on a three-dimensional model of the structure;
determine a trigger location along the scan path that corresponds to an inspection location of the structure;
instruct the robot controller to move the optical head along the scan path relative to the first surface of the structure using the robotic arm;
determine when the optical head is at the trigger location;
instruct the robot controller to position the optical head at an initial device-position relative to the first surface of the structure at the trigger location;
instruct the multiplex controller to trigger generation of ultrasonic waves within the structure at the inspection location; to receive an array of ultrasound data, representative of a first portion of the ultrasonic waves propagating through the structure and returned to the first surface, from the laser ultrasound device, and to receive an array of second ultrasound data, representative of a second portion of the ultrasonic waves propagating through the structure to a second surface, opposite the first surface, detected by the transducer ultrasound device;
process the array of ultrasound data and the array of second ultrasound data provided from the multiplex controller to inspect the structure; and
automatically deenergize the laser ultrasound device in response to the safety sensor detecting physical entry of the laser ultrasound device into the safety zone.

20. The system of claim 19, wherein:
the multiplex controller is coupled to a second laser ultrasound device positioned at the second surface; and
execution of the at least one computer-readable program by at least one processor further causes the computer system to instruct the multiplex controller to generate an array of fourth ultrasound data, representative of the second portion of the ultrasonic waves propagating through the structure to the second surface, from the second laser ultrasound device.

* * * * *